(12) United States Patent
Huo et al.

(10) Patent No.: US 12,058,373 B2
(45) Date of Patent: *Aug. 6, 2024

(54) TRANSFORM METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Xinwei Li, Guangdong (CN); Wenhan Qiao, Guangdong (CN); Yanzhuo Ma, Guangdong (CN); Shuai Wan, Guangdong (CN); Fuzheng Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 53 days.

This patent is subject to a terminal disclaimer.

(21) Appl. No.: 17/807,671

(22) Filed: Jun. 17, 2022

(65) Prior Publication Data

US 2022/0329861 A1 Oct. 13, 2022

Related U.S. Application Data

(63) Continuation of application No. PCT/CN2019/130850, filed on Dec. 31, 2019.

(51) Int. Cl.
*H04N 19/61* (2014.01)
*H04N 19/12* (2014.01)
(Continued)

(52) U.S. Cl.
CPC ........... *H04N 19/61* (2014.11); *H04N 19/12* (2014.11); *H04N 19/129* (2014.11); *H04N 19/159* (2014.11); *H04N 19/176* (2014.11)

(58) Field of Classification Search
CPC ...... H04N 19/61; H04N 19/12; H04N 19/129; H04N 19/159; H04N 19/176
(Continued)

(56) References Cited

U.S. PATENT DOCUMENTS

2019/0306526 A1 10/2019 Cho et al.
2023/0379472 A1* 11/2023 Koo ............... H04N 19/186

FOREIGN PATENT DOCUMENTS

| CN | 106254883 A | 12/2016 |
| CN | 108141597 A | 6/2018 |
| CN | 109076222 A | 12/2018 |

OTHER PUBLICATIONS

Zhang et al. "Non-CE6: On LFNST transform set selection for a CCLM coded block", Joint Video Experts Team (JVET) of ITU-T SG 16 WP 3 and ISO/IEC JTC 1/SC 29/WG 11 Document: JVET-O0219-v1, 15th Meeting: Gothenburg, SE, Jul. 3-12, 2019 (Year: 2019).*

(Continued)

*Primary Examiner* — Ayman A Abaza
(74) *Attorney, Agent, or Firm* — Perkins Coie LLP

(57) ABSTRACT

A transform method applied to an encoder includes: determining a prediction mode parameter of a current block; determining a CCLM parameter when the prediction mode parameter indicates that CCLM is used for the current block to determine an intra prediction value; determining the intra prediction value of the current block according to the CCLM parameter and calculating a residual value between the current block and the intra prediction value; performing a first transform on the residual value to obtain a first coefficient matrix; determining an LFNST coefficient scanning order used for the current block according to the CCLM parameter when an LFNST is used for the current block; constructing an input coefficient matrix of the LFNST by using the first coefficient matrix according to the LFNST (Continued)

coefficient scanning order; and performing an LFNST processing on the input coefficient matrix to obtain a transform coefficient matrix of the current block.

11 Claims, 8 Drawing Sheets

(51) Int. Cl.
*H04N 19/129* (2014.01)
*H04N 19/159* (2014.01)
*H04N 19/176* (2014.01)

(58) Field of Classification Search
USPC .................................................... 375/240.12
See application file for complete search history.

(56) References Cited

OTHER PUBLICATIONS

Bross, B., et al., Joint Video Experts Team (JVET)—of ITU-T SG 16 WP 3 and ISO/IEC JTC 1/SC 29/WG 11—15th Meeting: Gothenburg, SE, Jul. 3-12, 2019—Document: JVET-O2001—Versatile Video Coding (Draft 6) (456 pages).
Bross, B., et al., Joint Video Experts Team (JVET)—of ITU-T SG 16 WP 3 and ISO/IEC JTC 1/SC 29/WG 11—16th Meeting: Geneva, CH, Oct. 1-11, 2019—JVET-P2001—Versatile Video Coding (Draft 7) (494 pages).
International Search Report issued Oct. 10, 2020 of PCT/CN2019/130850 (5 pages).
ITU-T—H.265 (Feb. 2018)—Telecommunication Standardization Sector of ITU—Series H: Audiovisual and Multimedia Systems—Infrastructure of audiovisual services—Coding of moving video, High efficiency video coding (692 pages).
ITU-T—H.265 (Apr. 2013)—Telecommunication Standardization Sector of ITU—Series H: Audiovisual and Multimedia Systems—Infrastructure of audiovisual services—Coding of moving video, High efficiency video coding (317 pages).
ITU-T—H.265 (Apr. 2015)—Telecommunication Standardization Sector of ITU—Series H: Audiovisual and Multimedia Systems—Infrastructure of audiovisual services—Coding of moving video, High efficiency video coding (634 pages).
ITU-T—H.265 (Jun. 2019)—Telecommunication Standardization Sector of ITU—Series H: Audiovisual and Multimedia Systems—Infrastructure of audiovisual services—Coding of moving video, High efficiency video coding (696 pages).
ITU-T—H.265 (Aug. 2021)—Telecommunication Standardization Sector of ITU—Series H: Audiovisual and Multimedia Systems—Infrastructure of audiovisual services—Coding of moving video, High efficiency video coding (716 pages).
ITU-T—H.265 (Oct. 2014)—Telecommunication Standardization Sector of ITU—Series H: Audiovisual and Multimedia Systems—Infrastructure of audiovisual services—Coding of moving video, High efficiency video coding (540 pages).
ITU-T—H.265 (Nov. 2019)—Telecommunication Standardization Sector of ITU—Series H: Audiovisual and Multimedia Systems—Infrastructure of audiovisual services—Coding of moving video, High efficiency video coding (712 pages).
ITU-T—H.265 (Dec. 2016)—Telecommunication Standardization Sector of ITU—Series H: Audiovisual and Multimedia Systems—Infrastructure of audiovisual services—Coding of moving video, High efficiency video coding (664 pages).
ITU-T—H.266 (Aug. 2020)—Telecommunication Standardization Sector of ITU—Series H: Audiovisual and Multimedia Systems—Infrastructure of audiovisual services—Coding of moving video, Versatile video coding (516 pages).
Koo, M.,et al., Joint Video Experts Team (JVET)—of ITU-T SG 16 WP 3 and ISO/IEC JTC 1/SC 29/WG 11—14th Meeting: Geneva, CH, Mar. 19-27, 2019—Document: JVET-N0193—LG Electronics Inc., CE6: Reduced Secondary Transform (RST) (CE6-3.1) (19 pages).
Zhang, Z., et al., Joint Video Experts Team (JVET)—of ITU-T SG 16 WP 3 and ISO/IEC JTC 1/SC 29/WG 11—15th Meeting: Gothenburg, SE, Jul. 3-12, 2019—Document: JVET-O0219-v1—Ericsson, Non-CE6: On LFNST transform set selection for a CCLM coded block (4 pages).
Written Opinion of the International Searching Authority mailed Oct. 10, 2020 of PCT/CN2019/130850 (10 pages).
Bross, B. et al. "Versatile Video Coding (Draft 5)" JVET-N1001-v10; JVET of ITU-T SG 16 WP 3 and ISO/IEC JTC 1/SC 29/WG 11; 14th Meeting; Geneva, CH; Mar. 19-27, 2019. 406 pages.
Chen, J.. et al. "Algorithm decription for Versatile Video Coding and Test Model 5 (VTM 5)" JVET-N1002-v1; JVET of ITU-T SG 16 WP 3 and ISO/IEC JTC 1/SC 29/WG 11; 14th Meeting; Geneva, CH; Mar. 19-27, 2019. 70 pages.
Extended European Search Report for European Application No. 19958506.8 issued Jan. 9, 2023. 11 pages.
Examination Report for EP Application No. 19958280.0 Issued May 7, 2024, 7 Pages.
Bross et al., "Versatile Video Coding (Draft 5)", Joint Video Experts Team (JVET) of ITU-T SG 16 WP 3 and ISO/IEC JTC1/SC29AWG11, JVET-N1001-v8_proposal_text_JVET-O0219, Mar. 2019. 397 Pages.

* cited by examiner

TRANSFORM METHOD, ENCODER, DECODER, AND STORAGE MEDIUM

CROSS-REFERENCE TO RELATED APPLICATION

The present application is a continuation application of the International PCT Application No. PCT/CN2019/130850, having an international filing date of Dec. 31, 2019, the entire content of which is hereby incorporated by reference.

TECHNICAL FIELD

Embodiments of the present application relate to the field of picture processing technologies, and more particularly, to a transform method, an encoder, a decoder, and a storage medium.

BACKGROUND

With improvement of people's requirements for video display quality, new video application forms such as high-definition and ultra-high-definition videos have emerged. H.265/High Efficiency Video Coding (HEVC) has become unable to meet requirements of rapid development of video applications. The Joint Video Exploration Team (JVET) puts forward the next generation video coding standard H.266/Versatile Video Coding (VVC), a corresponding test model of which is a VVC Test Model (VTM).

At present, in H.266/VVC, a Reduced Second Transform (RST) technology has been accepted and renamed as a Low-Frequency Non-Separable Transform (LFNST) technology. Among them, the LFNST technology mainly includes five acts: configuring a core parameter, intra prediction mode mapping, transform matrix selection, matrix multiplication calculation, and primary transform coefficient matrix construction. Specifically, when a primary transform coefficient matrix is constructed, a scanning order indicates a corresponding position in a two-dimensional coefficient matrix of an element in a one-dimensional vector, while the scanning order is determined according to an intra prediction mode. However, for a non-traditional intra prediction mode, such as a Cross-component Linear Model Prediction (CCLM) mode, which needs to be mapped into a traditional intra prediction mode before determining a scanning order. That is to say, applicability of the LFNST technology to the CCLM mode is poor, and an extra mapping processing increases a transform process of the LFNST technology, thus reducing an encoding efficiency.

SUMMARY

The embodiments of the present application provide a transform method, an encoder, a decoder, and a storage medium, which may improve applicability of an LFNST technology to a CCLM mode, reduce a transform process of the LFNST technology and effectively improve an encoding efficiency.

Technical solutions of the embodiments of the present application may be implemented as follows.

In a first aspect, an embodiment of the present application provides a transform method, which is applied to an encoder, the method includes: determining a prediction mode parameter of a current block; determining a Cross-component Linear Model Prediction (CCLM) parameter when the prediction mode parameter indicates that CCLM is used for the current block to determine an intra prediction value; determining the intra prediction value of the current block according to the CCLM parameter and calculating a residual value between the current block and the intra prediction value; performing a first transform on the residual value to obtain a first coefficient matrix; determining a Low-Frequency Non-Separable Transform (LFNST) coefficient scanning order used for the current block according to the CCLM parameter when an LFNST is used for the current block; constructing an input coefficient matrix of the LFNST by using the first coefficient matrix according to the LFNST coefficient scanning order; and performing an LFNST processing on the input coefficient matrix to obtain a transform coefficient matrix of the current block; wherein the first transform is a transform different from the LFNST, and LFNST coefficient scanning orders include a horizontal scanning order and a vertical scanning order.

In a second aspect, an embodiment of the present application provides a transform method, which is applied to a decoder, the method includes: parsing a bitstream and determining a prediction mode parameter of a current block; parsing the bitstream and determining a Cross-component Linear Model Prediction (CCLM) parameter when the prediction mode parameter indicates that CCLM is used for the current block to determine an intra prediction value; parsing the bitstream and determining a Low-Frequency Non-Separable Transform (LFNST) intra prediction mode index and a transform coefficient of the current block; processing a transform coefficient matrix of the current block by using an LFNST to obtain an LFNST output coefficient matrix when the LFNST intra prediction mode index indicates that the LFNST is used for the current block; determining an LFNST coefficient scanning order used for the current block according to a Matrix-based Intra Prediction (MIP) parameter; and constructing a first coefficient matrix by using the LFNST output coefficient matrix according to the LFNST coefficient scanning order; wherein the LFNST coefficient scanning order includes a vertical scanning order and a horizontal scanning order.

In a third aspect, an embodiment of the present application provides an encoder, including: a first determination part, a calculation part, a first transform part, and a first construction part, wherein the first determination part is configured to determine a prediction mode parameter of a current block; determine a Cross-component Linear Model Prediction (CCLM) parameter when the prediction mode parameter indicates that CCLM is used for the current block to determine an intra prediction value; and determine the intra prediction value of the current block according to the CCLM parameter; the calculation part is configured to calculate a residual value between the current block and the intra prediction value according to the CCLM parameter; the first transform part is configured to perform a first transform on the residual value to obtain a first coefficient matrix; the first determination part is further configured to determine a Low-Frequency Non-Separable Transform (LFNST) coefficient scanning order used for the current block according to a Matrix-based Intra Prediction (MIP) parameter when an LFNST is used for the current block; the first construction part is configured to construct an input coefficient matrix of the LFNST by using the first coefficient matrix according to the LFNST coefficient scanning order; the first transform part is further configured to perform an LFNST processing on the input coefficient matrix to obtain a transform coefficient matrix of the current block; wherein the first transform is a transform different from the LFNST, and LFNST coefficient scanning orders include a horizontal scanning order and a vertical scanning order.

In a fourth aspect, an embodiment of the present application provides an encoder including a first processor and a first memory in which instructions executable by the first processor are stored, and when the instructions are executed by the first processor, the above transform methods are implemented.

In a fifth aspect, an embodiment of the present application provides a decoder, including: a parsing part, a second transform part, a second determination part, and a second construction part, wherein the parsing part is configured to parse a bitstream and determine a prediction mode parameter of a current block; parse the bitstream and determine a Cross-component Linear Model Prediction (CCLM) parameter when the prediction mode parameter indicates that CCLM is used for the current block to determine an intra prediction value; and parse the bitstream and determine a transform coefficient matrix of the current block and a Low-Frequency Non-Separable Transform (LFNST) intra prediction mode index; the second transform part is configured to process the transform coefficient matrix of the current block by using an LFNST to obtain an LFNST output coefficient matrix when the LFNST intra prediction mode index indicates that the LFNST is used for the current block; the second determination part is configured to determine an LFNST coefficient scanning order used for the current block according to an MIP parameter; the second construction part is configured to construct a first coefficient matrix by using the LFNST output coefficient matrix according to the LFNST coefficient scanning order; wherein the LFNST coefficient scanning order includes a vertical scanning order and a horizontal scanning order.

In a sixth aspect, an embodiment of the present application provides a decoder including a second processor and a second memory in which instructions executable by the second processor are stored, and when the instructions are executed by the second processor, the above transform methods are implemented.

In a seventh aspect, an embodiment of the present application provides a computer-readable storage medium, on which a computer program is stored, wherein when the computer program is executed by a first processor and a second processor, the above transform methods are implemented.

The embodiments of the present application provide a transform method, an encoder, a decoder, and a storage medium, wherein the encoder determines a prediction mode parameter of a current block; a CCLM parameter is determined when the prediction mode parameter indicates that CCLM is used for the current block to determine an intra prediction value; the intra prediction value of the current block is determined according to the CCLM parameter, and a residual value between the current block and the intra prediction value is calculated; a first transform is performed on the residual value to obtain a first coefficient matrix; when an LFNST is used for the current block, an LFNST coefficient scanning order used for the current block is determined according to the CCLM parameter; an input coefficient matrix of the LFNST is constructed by using the first coefficient matrix according to the LFNST coefficient scanning order; an LFNST processing is performed on the input coefficient matrix to obtain a transform coefficient matrix of the current block; wherein the first transform is a transform different from the LFNST, and LFNST coefficient scanning orders include a horizontal scanning order and a vertical scanning order. The decoder parses a bitstream and determines a prediction mode parameter of a current block. When the prediction mode parameter indicates that CCLM is used for the current block to determine an intra prediction value, the bitstream is parsed and a CCLM parameter is determined. The bitstream is parsed and an LFNST intra prediction mode index and a transform coefficient of the current block are determined. When the LFNST intra prediction mode index indicates that an LFNST is used for the current block, a transform coefficient matrix of the current block is processed by using the LFNST to obtain an LFNST output coefficient matrix. According to the CCLM parameter, an LFNST coefficient scanning order used for the current block is determined. According to the LFNST coefficient scanning order, a first coefficient matrix is constructed by using the LFNST output coefficient matrix; wherein the LFNST coefficient scanning order includes a vertical scanning order and a horizontal scanning order. Therefore, in an embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to a CCLM parameter corresponding to the current block, so that an LFNST transform may be performed by using the LFNST coefficient scanning order. It may be understood that it is precisely because of introduction of a CCLM parameter in an LFNST transform that selection of an LFNST coefficient scanning order is more flexible, which may improve applicability of an LFNST technology to a CCLM mode, reduce a transform process of the LFNST technology and effectively improve an encoding efficiency.

DETAILED DESCRIPTION

Figure 1:
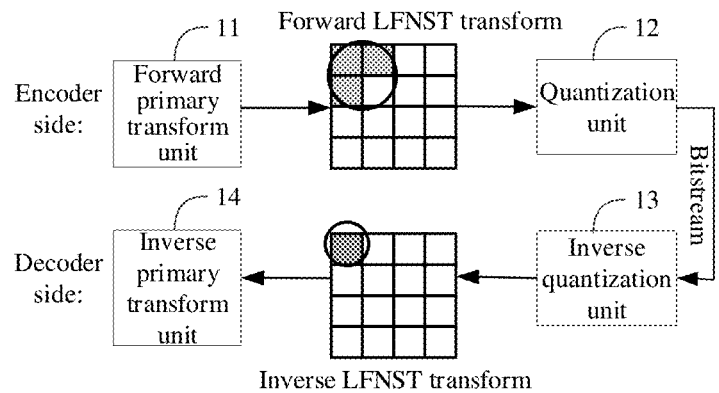
FIG. 1 is a schematic diagram of an application of an LFNST technology.

In order to understand features and technical contents of embodiments of the present application in more detail, implementations of the embodiments of the present application will be described in detail below in combination with the accompanying drawings, which are for reference only and are not intended to limit the embodiments of the present application.

In a video picture, a Coding Block (CB) is generally characterized by a first colour component, a second colour component, and a third colour component. The three colour components are respectively a luma component, a blue chroma component, and a red chroma component. Specifically, the luma component is usually represented by a symbol Y, the blue chroma component is usually represented by a symbol Cb or U, and the red chroma component is usually represented by a symbol Cr or V. In this way, the video picture may be represented in a format of YCbCr or a format of YUV.

In an embodiment of the present application, the first colour component may be a luma component, the second colour component may be a blue chroma component, and the third colour component may be a red chroma component, which is not specifically limited in the embodiments of the present application.

In H.266, in order to further improve encoding performance and encoding efficiency, Cross-component Prediction (CCP) is extended and improved, and Cross-component Linear Model Prediction (CCLM) is proposed. In H.266, CCLM achieves prediction from a first colour component to a second colour component, prediction from the first colour component to a third colour component, and prediction between the second colour component and the third colour component.

Specifically, in an embodiment of the present application, when a CCLM method achieves prediction from a luma component to a chroma component, in order to reduce redundancy between the luma component and the chroma component and redundancy between different chroma components, a Cross-component Linear Model Prediction (CCLM) mode is used in the next generation video coding standard. For example, according to a formula (1), a prediction value of chroma is constructed by using a reconstructed luma value of a same coding block.

$$\text{Pred}_C[i,j] = \alpha \cdot \text{Rec}_L[i,j] + \beta \quad (1)$$

In which, i, j indicates a position coordinate of a sample in a coding block, i indicates a horizontal direction, j indicates a vertical direction, $\text{Pred}_C[i, j]$ indicates a prediction value of a second colour component of a sample with a position coordinate of [i, j] in a coding block, $\text{Rec}_L[i, j]$ indicates a reconstructed value of a first colour component of a sample with a position coordinate of [i, j] (after down-sampling) in a same coding block, α and β are scale factors of a linear model, which may be derived by minimizing a regression error of an adjacent reference value of the first colour component and an adjacent reference value of the second colour component, as shown in a following formula (2).

$$\begin{cases} \alpha = \dfrac{N \cdot \sum (L(n) \cdot C(n)) - \sum L(n) \cdot \sum C(n)}{N \cdot \sum (L(n) \cdot L(n)) - \sum L(n) \cdot \sum L(n)} \\ \beta = \dfrac{\sum C(n) - \alpha \cdot \sum L(n)}{N} \end{cases} \quad (2)$$

In which, L(n) represents the adjacent reference value of the first colour component after down-sampling (e.g. left and upper sides), C(n) represents the adjacent reference value of the second colour component (e.g. left and upper sides), and N is a quantity of adjacent reference values of the second colour component.

Specifically, in addition to including a method for predicting a chroma component with a luma component, i.e., a method for predicting a second colour component with a first colour component or predicting a third colour component with a first colour component, the CCLM mode also includes prediction between two chroma components, i.e., also includes an approach of prediction between a second colour component and a third colour component. In an embodiment of the present application, a Cr component may be predicted from a Cb component, and the Cb component may also be predicted from the Cr component.

It should be noted that in an embodiment of the present application, prediction between chroma components in CCLM, that is, prediction between a second colour component and a third colour component, may be applied to a residual domain. Taking prediction of a Cr component as an example, a Cb residual may be used for predicting a Cr residual. A final prediction value of the Cr component is obtained by adding a weighted reconstructed Cb residual to a traditional intra prediction value of the Cr component, as shown in a formula (3).

$$\text{Pred}^*_{Cr}[i,j] = \gamma \cdot \text{resi}_{Cb}'[i,j] + \text{Pred}_{Cr}[i,j] \quad (3)$$

In which, $\text{pred}^*_{Cr}[i, j]$ represents a final prediction value of a Cr component of a sample with a position coordinate of [i, j] in the current coding block, $\text{resi}_{Cb}'[i, j]$ is a prediction residual of a reconstructed Cb component, and a calculation method of a scale factor γ is the same as a calculation method of a parameter of a prediction model from a luma component to a chroma component in CCLM, but an only difference is that a regression cost related to a default γ value in an error function is added. Therefore, an obtained scale factor γ may be biased towards a default value of −0.5. Specifically, the scale factor γ may be calculated through a formula (4).

$$\gamma = \dfrac{N \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \quad (4)$$

In which, Cb(n) represents an adjacent reference Cb value of the current coding block, Cr(n) represents an adjacent reference Cr value of the current coding block, and λ may be an empirical value, for example, λ=Σ(Cb(n)·Cb(n))>>9.

In H.266/VVC, an RST technology proposed by LGE in JVET-N0193 has been accepted and renamed as an LFNST technology. In subsequent meetings, with development of standards, the LFNST technology has been continuously optimized. The following will describe related technical solutions of a current LFNST technology.

FIG. 1 is a schematic diagram of an application of an LFNST technology. Referring to FIG. 1, FIG. 1 shows a schematic diagram of an application position of an LFNST technology according to a related technical solution. As shown in FIG. 1, in an intra prediction mode, for an encoder side, the LFNST technology is applied between a forward primary transform unit 11 and a quantization unit 12, and the LFNST technology is applied between an inverse quantization unit 13 and an inverse primary transform unit 14.

Specifically, on the encoder side, firstly, for data, such as a prediction residual (which may be represented by residual), a first transform (which may be called "Core Transform" or "primary transform" or "main transform") is performed by the forward primary transform unit 11 to obtain a transform coefficient matrix after the first transform; then, an LFNST transform (which may be called "Secondary Transform" or "second transform") is performed on coefficients in the transform coefficient matrix to obtain an LFNST transform coefficient matrix. Finally, the LFNST transform coefficient matrix is quantized by the quantization unit 12, and final quantized values are signalled in a video bitstream.

On a decoder side, the quantized values of the LFNST transform coefficient matrix may be obtained by parsing the bitstream, and an inverse quantization processing (which may be called "Scaling") is performed on the quantized values by the inverse quantization unit 13 to obtain restored values of the LFNST transform coefficient matrix, and an inverse LFNST transform is performed on the restored values and a coefficient matrix may be obtained. Then, an inverse transform corresponding to the "Core Transform" of the encoder side is performed on the coefficient matrix by the inverse primary transform unit 14, and finally a restored value of a residual is obtained. It should be noted that only an "inverse transform" operation on the decoder side is defined in the standard, so an "inverse LFNST transform" in the standard is also called an "LFNST transform". Here, in order to distinguish it from a transform on the encoder side, an "LFNST transform" on the encoder side may be called a "forward LFNST transform" and an "LFNST transform" on the decoder side may be called an "inverse LFNST transform".

That is to say, on the encoder side, for a prediction residual of a current transform unit, primary transform coefficients may be obtained through a forward primary transform, then part of the primary transform coefficients are subjected to a second transform through matrix multiplication to obtain fewer and more concentrated second transform coefficients, which are then quantized. On the decoder side, after parsing out quantized values, an inverse quantization processing is performed on them, an inverse second transform is performed on coefficients after inverse quantization through matrix multiplication, and then an inverse primary transform is performed on coefficients after the inverse second transform, so as to recover the prediction residual.

In the LFNST technology, an LFNST transform process may include following acts: configuring a core parameter, intra prediction mode mapping, selecting a transform matrix, calculating matrix multiplication, and constructing an inverse primary transform coefficient matrix, etc. After these acts, the LFNST transform is completed. However, in the act of selecting the transform matrix, a transform set needs to be selected first. Since the transform matrix is related to directional characteristics of a prediction mode, the transform set is currently selected according to an intra prediction mode. Among them, for a traditional intra prediction mode, a value of an intra prediction mode indicator may be determined according to a number of the traditional intra prediction mode, and then an index of a transform set may be determined according to the value of the intra prediction mode indicator.

Figure 2:
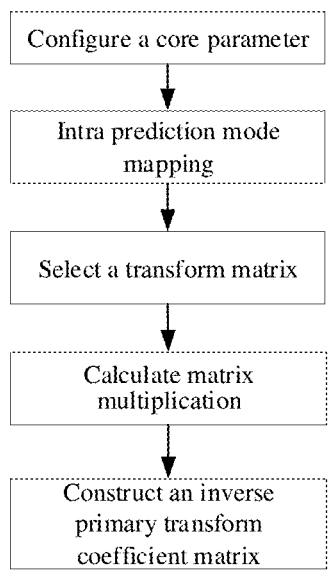
FIG. 2 is a flowchart of a specific process of an LFNST.

Specifically, FIG. 2 is a flowchart of a specific process of an LFNST. As shown in FIG. 2, a specific process of an LFNST may be partitioned into five acts, including configuring a core parameter, intra prediction mode mapping, selecting a transform matrix, calculating matrix multiplication, and constructing a primary transform coefficient matrix. Among them, for the intra prediction mode mapping, this act is used for determining a value of predModeIntra, and mainly includes: non-traditional intra prediction mode mapping and wide-angle mapping. For the selecting the transform matrix, this act is used for selecting a transform set and a transform matrix, and mainly includes: selecting a transform set, selecting a transform matrix group, and selecting a size of a transform matrix.

For the configuring the core parameter, firstly a length of an input second transform coefficient vector (which may be represented by nonZeroSize) and a length of an output primary transform coefficient vector (which may be represented by nLfnstOutSzie) for LFNST calculation need to be configured.

In addition, a parameter nLfnstSize needs to be configured, which means that there will be a primary transform coefficient only within a range of first nLfnstSize×nLfnstSize in a current block. At this time, by parsing a bitstream, an intra prediction mode of a luma or chroma component of the current block or a coding block where the current block is located may also be acquired, and a value of an intra prediction mode indicator (which may be expressed by predModeIntra) may be determined.

Further, a vector u[i] of a second transform coefficient is acquired, i=0, 1, . . . , nonZeroSize−1. When it is determined that an LFNST is used for a current transform unit, a coefficient d[x][y] after Scaling at this time is a second transform coefficient. First nonZeroSize values are acquired according to a diagonal scanning order, that is, the vector u[i] of the second transform coefficient, i=0, 1, . . . , nonZeroSize−1.

Further, for mapping of an intra prediction mode, the intra prediction mode may be partitioned into a traditional intra prediction mode and a non-traditional intra prediction mode. For a non-traditional intra prediction mode, information indicated by a value of predModeIntra is as follows: it indicates that a prediction mode of a current block is a CCLM mode if the value of predModeIntra may be INTRA_LT_CCLM, INTRA_L_CCLM, or INTRA_T_CCLM (81, 82, 83 in VVC respectively); it indicates that a prediction mode of a current block is a Matrix-based Intra Prediction (MIP) mode if intra_mip_flag[xTbY][yTbY] is equal to 1 and cIdx is equal to 0, and at this time the value of predModeIntra indicates a MIP mode index modeId used; if it is not in the above two situations, the value of predModeIntra may be in [0, 66], which indicates that a prediction mode of a current block is a traditional intra prediction mode.

At present, when determining an index of an LFNST transform kernel candidate set by parsing a bitstream according to a number of a traditional intra prediction mode, if a prediction mode of a current block is a CCLM mode or a MIP mode, and the current block is in a non-traditional intra prediction mode, a following method is mainly used for setting a value of predModeIntra.

(1) When the value of predModeIntra indicates INTRA_LT_CCLM, INTRA_L_CCLM, or INTRA_T_CCLM (81, 82, 83 in VVC respectively), if a mode of a central luma block of a luma position corresponding to the current block (such as a chroma block) is a MIP mode, that is, intra_mip_flag [xTbY+nTbW/2][yTbY+nTbH/2] is 1, then the value of predModeIntra is set to an index (i.e. 0) indicating a PLANAR mode; otherwise, if the mode of the central luma block of the luma position corresponding to the current block (such as the chroma block) is an IBC mode or a PLT mode, the value of predModeIntra is set to an index (i.e. 1) indicating a DC mode; otherwise, the value of predModeIntra is set to a value IntraPredModeY[xTbY+nTbW/2] [yTbY+nTbH/2] of a mode index of the central luma block corresponding to the luma position of the current block (such as the chroma block).

(2) When intra_mip_flag[xTbY][yTbY] is equal to 1 and cIdx is equal to 0, that is, a prediction mode of a current block is a MIP mode, the value of predModeIntra may be directly set to an index (that is, 0) indicating a PLANAR mode.

For a traditional intra prediction mode (such as wide-angle mapping), in a process of parsing a bitstream, wide-angle mapping may be performed according to a size of a current block, and a traditional intra prediction mode [0, 66] may be extended to [−14, 80]. A specific mapping process is as follows.

First, a width-height scale factor (which may be expressed by whRatio) is calculated. For a current block that is not square (that is, nTbW is not equal to nTbH), at this time following correction may be made to a value of predModeIntra: if nTbW is greater than nTbH, predModeIntra is greater than or equal to 2, and predModeIntra is less than ((whRatio>1? (8+2×whRatio):8), then predModeIntra=(predModeIntra+65); otherwise, if the nTbW is less than nTbH, predModeIntra is less than or equal to 66, and predModeIntra is greater than ((whRatio>1? (60-2×whRatio):60), then predModeIntra=(predModeIntra-67).

In current H.266/VVC, an LFNST coefficient scanning order may be determined according to a value of predModeIntra. Specifically, if predModeIntra is less than or equal to 34, v[j] is filled into d'[x][y] according to a horizontal scanning order (raster scanning) Otherwise, v[j] is filled into d'[x][y] according to a vertical scanning order (a transposition order of raster scanning).

It may be understood that in the embodiment of the present application, it is precisely because an LFNST transform matrix is related to directional characteristics of a prediction mode, but for a non-traditional intra prediction mode, such as a CCLM mode, since a transform set cannot be selected, the mode needs to be mapped to a traditional intra prediction mode first. Specifically, when mapping, setting of a value of predModeIntra is mainly based on an intra prediction mode of a luma block at a center of a luma position corresponding to a chroma transform unit. That is, at present, if an intra prediction mode of a luma block at a center of a luma position corresponding to a chroma transform unit is a MIP mode, a CCLM mode may be mapped to PLANAR; if the intra prediction mode of the luma block at the center of the luma position corresponding to the chroma transform unit is an IBC mode or a PLT mode, the CCLM mode may be mapped to DC; if the intra prediction mode of the luma block at the center of the luma position corresponding to the chroma transform unit is a traditional intra prediction mode, wide-angle mapping is continued according to a size of a current chroma transform unit. Then, selection of a transform kernel candidate set is performed according to a mapped angle.

Figure 3:
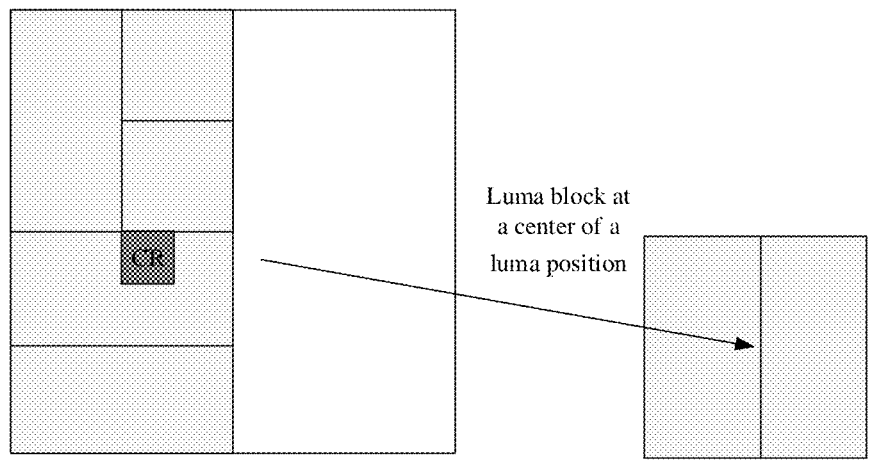
FIG. 3 is a schematic diagram of a luma block at a center of a luma position.

However, when mapping a non-traditional intra prediction mode through the above method, on one hand, if a CCLM mode is used for a current chroma transform unit, characteristics of a luma block at a center of a luma position corresponding to a chroma transform unit cannot represent characteristics of the current chroma transform unit, and it is unreasonable to select a transform kernel candidate set according to this characteristic; on the other hand, although a linear relationship used for a chroma block using CCLM is predicted from a corresponding luma block. However, a luma block at a center of a luma position corresponding to a chroma transform unit may only be a sub-block of the corresponding luma block, which cannot represent a characteristic of the whole corresponding luma block. For example, FIG. 3 is a schematic diagram of a luma block at a center of a luma position, as shown in FIG. 3, a right side is a chroma block and a left side is a luma block of a corresponding position. Then a luma block at a center of a luma position corresponding to a left gray sub-block in the chroma block is a dark colour sub-block (CR) in a left block. An acquired luma block mode is only a mode of the dark colour sub-block (CR), which cannot represent overall characteristics of a gray block in the left block. On the other hand, an existing solution introduces dependence between chroma and luma in a transform process. Finally, since intra prediction modes supported by luma and chroma are different, when an intra prediction mode of a luma block at a center of a luma position corresponding to a chroma transform unit is not supported in a chroma block, such as MIP, IBC, and PLT modes, additional mapping is needed.

That is to say, for current H.266/VVC, a CCLM mode needs to be mapped to a traditional intra prediction mode before a scanning order can be determined. However, the above mapping method is less accurate, and new mapping may be introduced. It may be seen that applicability of a current LFNST technology to a CCLM mode is poor, and an extra mapping process increases a transform process of an LFNST technology, thus reducing an encoding efficiency.

In order to overcome the above defects, in the embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to CCLM parameters corresponding to the current block, so that an LFNST transform may be performed by using the an LFNST coefficient scanning order. It may be understood that it is precisely because of introduction of CCLM parameters in an LFNST transform that selection of an LFNST coefficient scanning order is more flexible, which may improve applicability of an LFNST technology to a CCLM mode, reduce a transform process of the LFNST technology and effectively improve an encoding efficiency.

Figure 4:
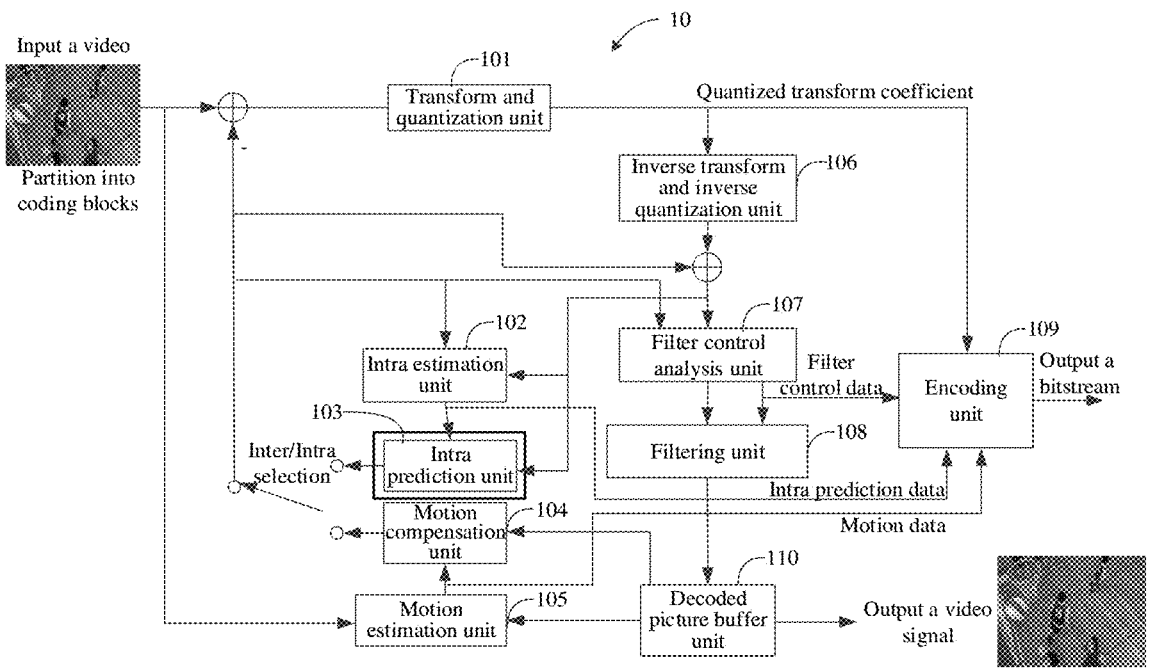
FIG. 4 is a block diagram of a composition of a video encoding system.

It should be noted that in the embodiment of the present application, FIG. 4 is a block diagram of a composition of a video encoding system. Referring to FIG. 4, it shows an example of a block diagram of a composition of a video encoding system according to an embodiment of the present application. As shown in FIG. 4, the video encoding system 10 includes: a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, an encoding unit 109, and a decoded picture buffer unit 110. The filtering unit 108 may implement de-blocking filtering and Sample Adaptive Offset (SAO) filtering, and the encoding unit 109 may implement header information coding and Context-based Adaptive Binary Arithmetic Coding (CABAC). For an input original video signal, a video coding block may be obtained by partitioning a Coding Tree Unit (CTU), and then for residual pixel information obtained after intra or inter prediction, the video coding block is transformed through the transform and quantization unit 101, including transforming residual information from a pixel domain to a transform domain, and quantizing an obtained transform coefficient to further reduce a bit rate. The intra estimation unit 102 and the intra prediction unit 103 are used for intra prediction of the video coding block. In particular, the intra estimation unit 102 and the intra prediction unit 103 are used for determining an intra prediction mode to be used for encoding the video coding block. The motion compensation unit 104 and the motion estimation unit 105 are used for performing inter prediction coding of a received video coding block with respect to one or more blocks in one or more reference frames to provide temporal prediction information. Motion estimation performed by the motion estimation unit 105 is a process of generating a motion vector that may be used for estimating motion of the video coding block, and then the motion compensation unit 104 performs motion compensation based on the motion vector determined by the motion estimation unit 105. After determining the intra prediction mode, the intra prediction unit 103 is further used for providing selected intra prediction data to the encoding unit 109, and the motion estimation unit 105 also sends calculated and determined motion vector data to the encoding unit 109. In addition, the inverse transform and inverse quantization unit 106 is used for reconstructing the video coding block, a residual block is reconstructed in the pixel domain, blocking artifacts are removed from the reconstructed residual block through the filter control analysis unit 107 and the filtering unit 108, and then the reconstructed residual block is added to a predictive block in a frame of the decoded picture buffer unit 110 to generate a reconstructed video coding block. The encoding unit 109 is used for encoding various coding parameters and quantized transform coefficients, in a CABAC-based coding algorithm, context content may be based on adjacent coding blocks, and may be used for encoding information indicating a determined intra prediction mode and outputting a bitstream of the video signal. The decoded picture buffer unit 110 is used for storing a reconstructed video coding block for prediction reference. As video picture encoding progresses, new reconstructed video coding blocks will be generated continuously, and these reconstructed video coding blocks will be stored in the decoded picture buffer unit 110.

Figure 5:
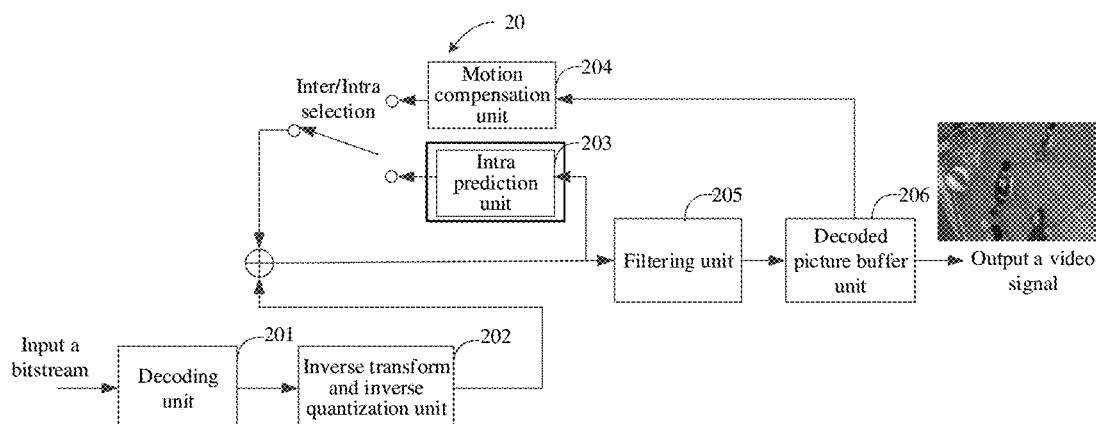
FIG. 5 is a block diagram of a composition of a video decoding system.

FIG. 5 is a block diagram of a composition of a video decoding system. Referring to FIG. 5, it shows an example of a block diagram of a composition of a video decoding system according to an embodiment of the present application. As shown in FIG. 5, the video decoding system 20 includes a decoding unit 201, an inverse transform and inverse quantization unit 202, an intra prediction unit 203, a motion compensation unit 204, a filtering unit 205, and a decoded picture buffer unit 206, etc. Here, the decoding unit 201 may implement header information decoding and CABAC decoding, and the filtering unit 205 may implement de-blocking filtering and SAO filtering. After the input video signal is encoded in FIG. 4, a bitstream of the video signal is output; the bitstream is input into the video decoding system 20, it first passes through the decoding unit 201 to obtain a decoded transform coefficient. The transform coefficient is processed through the inverse transform and inverse quantization unit 202 to generate a residual block in the pixel domain. The intra prediction unit 203 may be used for generating prediction data of a current video coding block based on the determined intra prediction mode and data from a previous coding block of a current frame or picture. The motion compensation unit 204 determines prediction information for the video coding block by analyzing a motion vector and another related syntax element, and uses the prediction information to generate a predictive block of the video coding block being decoded. A decoded video block is formed by summing the residual block from the inverse transform and inverse quantization unit 202 with a corresponding predictive block generated by the intra prediction unit 203 or the motion compensation unit 204. The decoded video signal passes through the filtering unit 205 to remove blocking artifacts, which may improve video quality. Then, the decoded video block is stored in the decoded picture buffer unit 206, the decoded picture buffer unit 206 stores a reference picture for subsequent intra prediction or motion compensation, and is also used for outputting a video signal, thus a restored original video signal is obtained.

The transform method in the embodiment of the present application may be applied to a part of the transform and quantization unit 101 as shown in FIG. 4, which includes the forward primary transform unit 11 and the quantization unit 12 as shown in FIG. 1. At this time, the transform method is specifically applied to a part between transform and quantization. In addition, the transform method in the embodiment of the present application may also be applied to a part of the inverse transform and inverse quantization unit 106 as shown in FIG. 4 or a part of the inverse transform and inverse quantization unit 202 as shown in FIG. 5. Both the inverse transform and inverse quantization unit 106 and the inverse transform and inverse quantization unit 202 may include the inverse quantization unit 13 and the inverse primary transform unit 14 as shown in FIG. 1. At this time, the transform method is specifically applied to a part between inverse quantization and inverse transform. That is to say, the transform method in the embodiment of the present application may be applied to the video encoding system or the video decoding system, or may even be applied to the video encoding system and the video decoding system at the same time, which is not specifically limited in the embodiment of the present application. It should also be noted that when the transform method is applied to the video encoding system, a "current block" specifically refers to a current coding block in intra prediction. When the transform method is applied to the video decoding system, a "current block" specifically refers to a current coding block in intra prediction.

Technical solutions in the embodiments of the present application will be clearly and completely described below in conjunction with the drawings in the embodiments of the present application.

Figure 6:
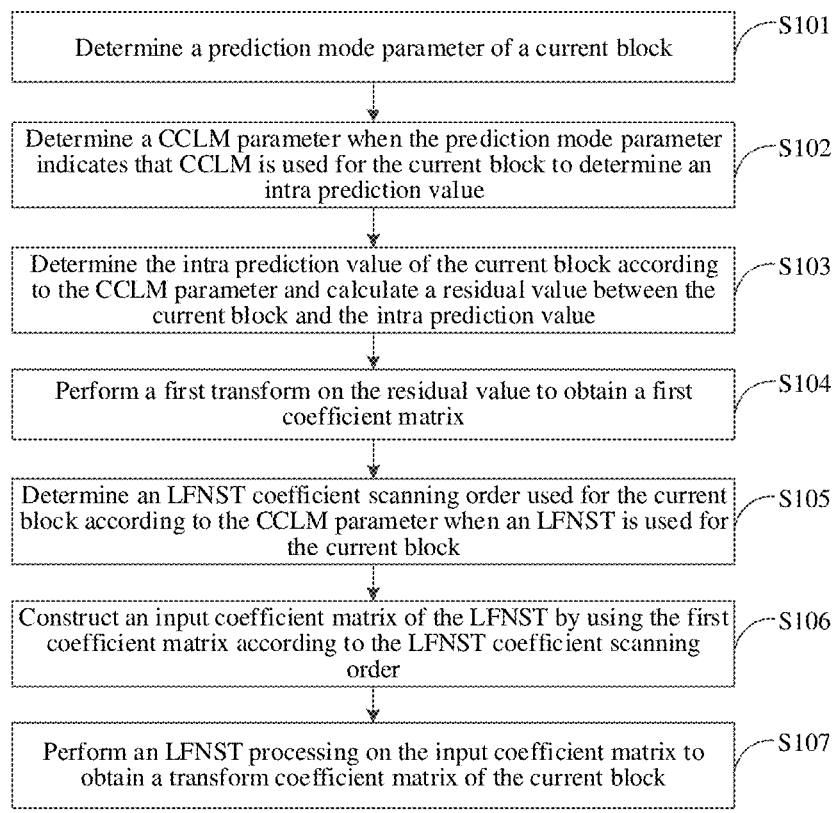
FIG. 6 is a first schematic diagram of an implementation flow of a transform method.

An embodiment of the present application provides a transform method, which is applied in an encoder. FIG. 6 is a first schematic diagram of an implementation flow of a transform method. As shown in FIG. 6, a method for performing a transform processing by an encoder may include following acts.

In act S101, a prediction mode parameter of a current block is determined.

In an embodiment of the present application, an encoder may first determine a prediction mode parameter of a current block.

It should be noted that in the embodiment of the present application, a video picture may be partitioned into multiple picture blocks, and each picture block to be encoded currently may be called a Coding Block (CB). Here, each coding block may include a first colour component, a second colour component, and a third colour component. A current block is a coding block of which a first colour component, a second colour component, or a third colour component is currently to be predicted, in the video picture.

It may be understood that in the embodiment of the present application, assuming that a first colour component is predicted for a current block, and the first colour component is a luma component, that is, a colour component to be predicted is a luma component, then the current block may also be called a luma block. Or, assuming that a second colour component is predicted for a current block, and the second colour component is a chroma component, that is, a colour component to be predicted is a chroma component, the current block may also be called a chroma block.

It should be noted that in the embodiment of the present application, a prediction mode parameter indicates a coding mode of a current block and a parameter related to the mode. Rate Distortion Optimization (RDO) may usually be used for determining the prediction mode parameter of the current block.

Further, in an embodiment of the present application, a coding mode may include two categories: a traditional intra prediction mode and a non-traditional intra prediction mode. Specifically, the traditional intra prediction mode may include a Direct Current (DC) mode, a PLANAR mode, an angular mode, etc. The non-traditional intra prediction mode may include a Matrix-based Intra Prediction (MIP) mode, a CCLM mode, an Intra Block Copy (IBC) mode, a Palette (PLT) mode, etc.

That is to say, in the embodiment of the present application, an encoder may determine a coding mode of a current block is specifically a traditional intra prediction mode or a non-traditional intra prediction mode, through a prediction mode parameter.

In an embodiment of the present application, further, when determining a prediction mode parameter of a current block, an encoder may first determine a colour component to be predicted of the current block; then, based on a parameter of the current block, the colour component to be predicted is predicted and encoded by using multiple prediction modes respectively, and a rate distortion cost result corresponding to each prediction mode in the multiple prediction modes is calculated; finally, a minimum rate distortion cost result may be selected from calculated multiple rate distortion cost results, and a prediction mode corresponding to the minimum rate distortion cost result is determined as the prediction mode parameter of the current block.

That is to say, on an encoder side, for a current block, multiple prediction modes may be adopted to encode a colour component to be predicted respectively. Here, multiple prediction modes usually include a traditional intra prediction mode and a non-traditional intra prediction mode.

Further, in an embodiment of the present application, after an encoder encodes a current block by using multiple prediction modes, a rate distortion cost result corresponding to each prediction mode may be obtained. Then a minimum rate distortion cost result is selected from obtained multiple rate distortion cost results, and a prediction mode corresponding to the minimum rate distortion cost result is determined as a prediction mode parameter of the current block. In this way, the current block may be encoded by using the determined prediction mode, and in this prediction mode, a prediction residual may be made small and an encoding efficiency may be improved.

In act S102, a Cross-component Linear Model Prediction (CCLM) parameter is determined when the prediction mode parameter indicates that CCLM is used for the current block to determine an intra prediction value.

In an embodiment of the present application, after an encoder determines a prediction mode parameter of a current block, if the prediction mode parameter indicates that CCLM is used for the current block to determine an intra prediction value, then the encoder may continue to determine a CCLM parameter.

It should be noted that, in an embodiment of the present application, a CCLM parameter may include a CCLM mode index, wherein the CCLM mode index is used for indicating a CCLM mode used for the current block, and the CCLM mode is used for indicating a calculation and derivation method of determining an intra prediction value of the current block by using CCLM.

It may be understood that in an embodiment of the present application, a CCLM mode may specifically include multiple different prediction modes, so different prediction modes in the CCLM mode need to be calibrated and distinguished by using different indices. That is to say, different CCLM modes correspond to different CCLM mode indices.

Further, in an embodiment of the present application, when an encoder determines a calculation and derivation method of an intra prediction value of a current block according to a CCLM parameter, it may determine a specific CCLM mode, so that a corresponding CCLM mode index may be obtained.

It should be noted that in an embodiment of the present application, a CCLM mode index may specifically include 81, 82, and 83.

It may be understood that in the present application, after determining a CCLM parameter, an encoder needs to signal the determined CCLM parameter in a bitstream, which is convenient for a subsequent parsing processing on a decoder side.

In act S103, the intra prediction value of the current block is determined according to the CCLM parameter and a residual value between the current block and the intra prediction value is calculated.

In an embodiment of the present application, after determining a CCLM parameter corresponding to a current block, an encoder may further determine an intra prediction value of the current block by using the CCLM parameter, so that a residual value between the current block and the intra prediction value may be calculated.

It should be noted that in an embodiment of the present application, after determining a CCLM parameter, an encoder may use a CCLM mode index included in the CCLM parameter to determine a CCLM mode used for a current block, so that a calculation and derivation method of determining an intra prediction value of the current block by using CCLM may be obtained.

Exemplarily, in an embodiment of the present application, when determining an intra prediction value of a current block according to a CCLM parameter, an encoder may calculate and obtain a prediction value of a second colour component of a sample of which a position coordinate is [i, j] in a coding block by using a reconstructed value of a first colour component of a sample of which a position coordinate is [i, j] in the coding block (after down-sampling) according to the above formula (1).

Exemplarily, in an embodiment of the present application, after determining an intra prediction value of a current block, an encoder may continue to calculate a difference between a real pixel value of the current block and the intra prediction value, and take the calculated difference as a residual, which is convenient for a transform processing on the residual later.

It may be understood that in an embodiment of the present application, an encoder may further determine a CCLM parameter during a process of determining an intra prediction value by using a CCLM mode, so that an LFNST transform kernel (which may be represented by kernel) used for the current block may be determined according to the CCLM parameter during a subsequent processing.

In act S104, a first transform is performed on the residual value to obtain a first coefficient matrix.

In an embodiment of the present application, after calculating and obtaining a residual value, an encoder may perform a first transform on the residual value, so that a first coefficient matrix may be obtained.

It should be noted that in an embodiment of the present application, a first transform is a transform different from an LFNST, and a first coefficient matrix may be a two-dimensional first transform coefficient matrix. In this way, after determining a residual value, a first transform will be performed on the residual value to obtain a first coefficient matrix, that is, a two-dimensional primary transform coefficient matrix; then, the two-dimensional primary transform coefficient matrix will be converted into an one-dimensional primary transform coefficient matrix through an LFNST coefficient scanning order; then, a second transform (that is, an LFNST processing) is performed on coefficients in the one-dimensional primary transform coefficient matrix to obtain an LFNST transform coefficient matrix. Finally, the LFNST transform coefficient matrix is quantized and encoded, and obtained quantized values are signalled in a video bitstream.

In act S105, an LFNST coefficient scanning order used for the current block is determined according to the CCLM parameter when an LFNST is used for the current block.

In an embodiment of the present application, if an LFNST transform technology is used for a current block, then an encoder may further determine an LFNST coefficient scanning order used for the current block according to a CCLM parameter.

It should be noted that in an embodiment of the present application, an LFNST transform is not available for any current block. Specifically, only when a current block meets certain preset conditions simultaneously, an LFNST transform may be performed on the current block. These preset conditions may include: (a) a width and a height of the current block are both greater than or equal to 4; (b) a width and a height of the current block are both less than or equal to a maximum size of a transform unit; (c) a prediction mode of the current block or a coding block where the current block is located is an intra prediction mode; (d) a primary transform of the current block is a two-dimensional forward primary transform (DCT2) in both horizontal and vertical directions; (e) an intra prediction mode of the current block or a coding block where the current block is located is a non-MIP mode, or a prediction mode of a transform unit is a MIP mode and a width and a height of the transform unit are both greater than or equal to 16. That is to say, for a current block in an embodiment of the present application, the above five conditions need to be met simultaneously to determine that an LFNST transform technology is used for the current block.

Further, in an embodiment of the present application, after determining that an LFNST may be performed for a current block, an LFNST coefficient scanning order used for the current block needs to be determined. Generally speaking, LFNST coefficient scanning orders include a horizontal scanning order and a vertical scanning order. Specifically, in the present application, according to a coding parameter of a current block or a coding block where a current block is located, a selected LFNST coefficient scanning order may be implicitly deduced. For example, in current H.266/VVC, a selected LFNST coefficient scanning order may be determined according to an intra prediction mode of a current block.

Specifically, in an embodiment of the present application, after obtaining an intra prediction mode of a current block, an encoder may determine a value of an intra prediction mode indicator (which may be represented by predModeIntra), and a calculation formula is as follows.

$$\text{predModeIntra}=(c\text{Idx}==0)?\text{IntraPredModeY}[xTbY][yTbY]:\text{IntraPredModeC}[xTbY][yTbY] \quad (5)$$

Among them, a colour component indicator (which may be represented by cIdx) is used for indicating a luma component or a chroma component of a current block. Here, if what is predicted for the current block is a luma component, then cIdx is equal to 0; if what is predicted for the current block is a chroma component, then cIdx is equal to 1. In addition, (xTbY, yTbY) is a coordinate of a sample in an upper left corner of the current block, IntraPredModeY[xTbY][yTbY] is an intra prediction mode of a luma component, and IntraPredModeC[xTbY][yTbY] is an intra prediction mode of a chroma component.

In current H.266/VVC, intra prediction modes may also be partitioned into a traditional intra prediction mode and a non-traditional intra prediction mode. For a non-traditional intra prediction mode, information indicated by a value of predModeIntra is as follows: if a prediction mode of a current block is a CCLM mode, the value of predModeIntra may be INTRA_LT_CCLM, INTRA_L_CCLM, or INTRA_T_CCLM (81, 82, 83 in VVC respectively); if a prediction mode of a current block is a MIP mode, the value of predModeIntra may be a MIP mode index used; if a prediction mode of a current block is a traditional intra prediction mode, the value of predModeIntra may be in [0, 66].

Further, if the prediction mode of the current block is a CCLM mode or a MIP mode, an encoder may also set the value of predModeIntra in following ways.

(1) When the prediction mode of the current block is a CCLM mode, if a mode of a central luma block of a luma position corresponding to the current block (such as a chroma block) is a MIP mode, that is, intra_mip_flag[xTbY+nTbW/2][yTbY+nTbH/2] is 1, then the value of predModeIntra is set to an index (i.e. 0) indicating a PLANAR mode; otherwise, if the mode of the central luma block of the luma position corresponding to the current block (such as the chroma block) is an IBC mode or a PLT mode, the value of predModeIntra is set to an index (i.e. 1) indicating a DC mode; otherwise, the value of predModeIntra is set to a value IntraPredModeY[xTbY+nTbW/2][yTbY+nTbH/2] of a mode index of the central luma block corresponding to the luma position of the current block (such as the chroma block).

(2) When the prediction mode of the current block is a MIP mode, the value of predModeIntra may be directly set to an index (i.e. 0) indicating a PLANAR mode.

For a traditional intra prediction mode (such as wide-angle mapping), wide-angle mapping may be performed according to a size of a current block, and a traditional intra prediction mode [0, 66] may be extended to [−14, 80]. A specific mapping process is as follows.

First, an aspect ratio factor (which may be represented by whRatio) is calculated, as shown below.

$$whRatio = Abs(Log\ 2(nTbW/nTbH)) \quad (6)$$

For a current block that is not square (that is, nTbW is not equal to nTbH), following correction may be made to predModeIntra at this time: if nTbW is greater than nTbH, predModeIntra is greater than or equal to 2, and predModeIntra is less than ((whRatio>1? (8+2×whRatio):8), then predModeIntra=(predModeIntra+65); otherwise, if the nTbW is less than nTbH, predModeIntra is less than or equal to 66, and predModeIntra is greater than ((whRatio>1? (60-2×whRatio):60), then predModeIntra=(predModeIntra-67).

In current H.266/VVC, an LFNST coefficient scanning order may be determined according to a value of predModeIntra. Specifically, if a value of predModeIntra is less than or equal to 34, elements in v[j] may be correspondingly filled into d'[x][y] according to a horizontal scanning order (raster scanning) The elements filled in d'[x][y] are as follows.

$$d'[x][y]=(y<4)?v[x+(y<<Log\ 2LfnstSize)]:((x<4)?v[32+x+((y-4)<<2)]:d[x][y]) \quad (7)$$

Here, when nLfnstSize is 8, the elements in v[j] are not correspondingly filled into a sub-block of 4×4 in a lower right corner of d'[ ][ ], and a coefficient after inverse quantization is still filled in this sub-block, that is, a value filled in this part should be 0.

Figure 7:
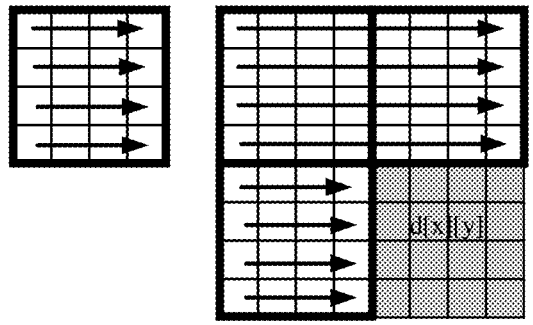
FIG. 7 is a schematic diagram of a structure of a horizontal scanning order.

FIG. 7 is a schematic diagram of a structure of a horizontal scanning order. As shown in FIG. 7; in FIG. 7, a sub-block of 4×4 in a lower right corner is filled with gray, and a part filled with gray is still filled with a coefficient after inverse quantization, that is, a filled value of this part should be 0.

On the contrary, if a value of predModeIntra is greater than 34, elements in v[j] may be correspondingly filled into d'[x][y] according to a vertical scanning order (that is, a transposition order of raster scanning) The elements filled in d'[x][y] are as follows.

$$d'[x][y]=(x<4)?v[y+(x<<Log\ 2\ LfnstSize)]:((y<4)?v[32+y+((x-4)<<2)]:d[x][y]) \quad (8)$$

Here, when nLfnstSize is 8, the elements in v[j] are not correspondingly filled into a sub-block of 4×4 in a lower right corner of d'[ ][ ], and a coefficient after inverse quantization is still filled in this sub-block, that is, a value filled in this part should be 0.

Figure 8:
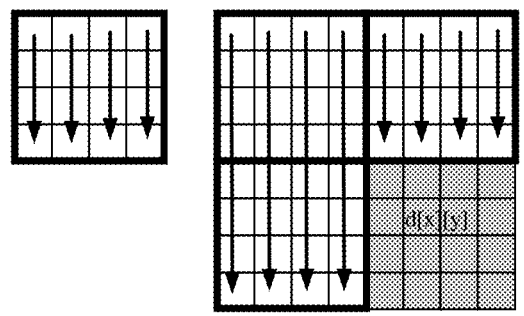
FIG. 8 is a schematic diagram of a structure of a vertical scanning order.

FIG. 8 is a schematic diagram of a structure of a vertical scanning order. As shown in FIG. 8; in FIG. 8, a sub-block of 4×4 in a lower right corner is filled with gray, and a part filled with gray is still filled with a coefficient after inverse quantization, that is, a filled value of this part should be 0.

It may be understood that in an embodiment of the present application, it is precisely because a transform matrix is related to directional characteristics of a prediction mode that a scanning order is currently selected according to an intra prediction mode. Here, for a scanning order, on an encoder side, it refers to a scanning order in which a two-dimensional primary transform coefficient is filled into a one-dimensional primary transform coefficient vector, while on a decoder side, it refers to a scanning order in which an one-dimensional primary transform coefficient vector is filled into a two-dimensional inverse primary transform coefficient matrix. Among them, for a traditional intra prediction mode, a value of an intra prediction mode indicator (which may be represented by predModeIntra) may be determined according to a number of the traditional intra prediction mode, and then a scanning order is determined as a horizontal scanning order or a vertical scanning order according to the value of predModeIntra. However, for a non-traditional frame prediction mode, such as a CCLM mode, it needs to be mapped into a traditional intra prediction mode first. Specifically, when mapping, setting of a value of predModeIntra is mainly based on an intra prediction mode of a luma block at a center of a luma position corresponding to a chroma transform unit. That is to say, at present, if an intra prediction mode of a luma block at a center of a luma position corresponding to a chroma transform unit is a MIP mode, a CCLM mode may be mapped to PLANAR; if the intra prediction mode of the luma block at the center of the luma position corresponding to the chroma transform unit is an IBC mode or a PLT mode, the CCLM mode may be mapped to DC; if the intra prediction mode of the luma block at the center of the luma position corresponding to the chroma transform unit is a traditional intra prediction mode, wide-angle mapping is continued to be performed according to a size of a current chroma transform unit. Then, according to a mapped angle, it is determined whether a scanning order is a horizontal scanning order or a vertical scanning order.

That is to say, for current H.266/VVC, a CCLM mode needs to be mapped to a traditional intra prediction mode before a scanning order can be determined. However, the above mapping method is less accurate, and new mapping may be introduced. It may be seen that applicability of a current LFNST technology to a CCLM mode is poor, and an extra mapping process increases a transform process of an LFNST technology, thus reducing an encoding efficiency.

Further, in an embodiment of the present application, if an LFNST transform technology is used for a current block, an encoder no longer determines a value of predModeIntra by mapping a CCLM mode to a traditional intra prediction mode, but determines a scanning order used for the current block based on a CCLM parameter. Specifically, an LFNST coefficient scanning order used for a current block may be determined by combining a CCLM parameter. At this time, a horizontal scanning order may be selected, and a vertical scanning order may also be selected, so that there is variability when an LFNST is performed in a CCLM mode and an encoding efficiency can be improved.

It may be understood that, in an embodiment of the present application, a CCLM parameter may include a CCLM mode index, wherein the CCLM mode index is used for indicating a CCLM mode used for a current block, and the CCLM mode is used for indicating a calculation and derivation method of determining an intra prediction value of the current block by using CCLM.

Figure 9:
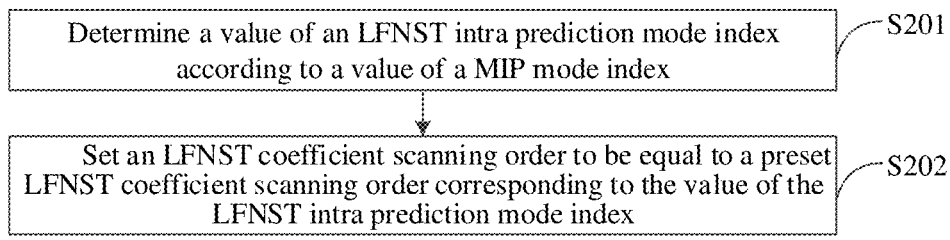
FIG. 9 is a second schematic diagram of an implementation flow of a transform method.

Exemplarily, in an embodiment of the present application, when an LFNST is used for a current block, FIG. 9 is the second schematic diagram of an implementation flow of a transform method. As shown in FIG. 9, when a CCLM parameter is a CCLM mode index, the method for an encoder to determine an LFNST coefficient scanning order used for a current block according to the CCLM parameter may include following acts.

In act S201, a value of a Low-Frequency Non-Separable Transform (LFNST) intra prediction mode index is determined according to a value of a Matrix-based Intra Prediction (MIP) mode index.

In act S202, an LFNST coefficient scanning order is set to be equal to a preset LFNST coefficient scanning order corresponding to the value of the LFNST intra prediction mode index.

It should be noted that, in an embodiment of the present application, a CCLM mode index is used for indicating a CCLM mode used for the current block, and the CCLM mode is used for indicating a calculation and derivation method of determining an intra prediction value of the current block by using CCLM. That is to say, an encoder may further determine an LFNST transform kernel according to a CCLM mode index.

Further, in an embodiment of the present application, after determining a CCLM mode index, an encoder may also convert the CCLM mode index into a value of an LFNST intra prediction mode index (which may be expressed by predModeIntra). Then, according to the value of predModeIntra, an LFNST coefficient scanning order is determined, such as a horizontal scanning order or a vertical scanning order.

It should be noted that in an embodiment of the present application, when an encoder determines an LFNST coefficient scanning order used for a current block, a value of an LFNST intra prediction mode index may be obtained by looking up a table.

Exemplarily, in an embodiment of the present application, when an encoder determines a value of an LFNST intra prediction mode index according to a value of a CCLM mode index, it may specifically use a first look-up table to determine the value of the LFNST intra prediction mode index corresponding to the value of the CCLM mode index, wherein the first look-up table at least contains one or more different CCLM mode indices corresponding respectively to each of two LFNST intra prediction mode indices of different values.

It should be noted that in an embodiment of the present application, the first look-up table (Look-Up Table 1, LUT1) is used for reflecting a corresponding relationship between a CCLM mode index and an LFNST intra prediction mode index, that is, the first look-up table at least contains one or more different CCLM mode indices corresponding respectively to each of two LFNST intra prediction mode indices of different values.

That is to say, in the present application, different CCLM modes may correspond to different values of predModeIntra. Therefore, an encoder determines a CCLM mode index according to a CCLM mode, then determines a value of predModeIntra according to a first look-up table, and then determines an LFNST coefficient scanning order used for a current block according to the value of predModeIntra.

It may be seen that in the present application, for a CCLM mode, an encoder no longer needs to select a transform kernel candidate set by mapping the CCLM mode to a traditional intra prediction mode, but may directly obtain a corresponding LFNST intra prediction mode index based on a CCLM mode index corresponding to the CCLM mode through query of a first look-up table, and finally determine an LFNST coefficient scanning order.

In an embodiment of the present application, further, a decoder may also directly determine an LFNST coefficient scanning order according to a value of a CCLM mode index. At this time, a value of predModeIntra is no longer needed, that is, a value of an LFNST intra prediction mode index is no longer needed to be determined according to a CCLM mode index.

In an embodiment of the present application, further, when an LFNST is used for a current block, when a decoder determines an LFNST coefficient scanning order used for the current block according to a CCLM parameter, the decoder may specifically set the LFNST coefficient scanning order to be equal to a preset LFNST coefficient scanning order corresponding to the value of the CCLM mode index.

Exemplarily, in an embodiment of the present application, when an encoder sets the LFNST coefficient scanning order to be equal to a preset LFNST coefficient scanning order corresponding to the value of the CCLM mode index, the encoder may specifically use a second look-up table to determine an LFNST coefficient scanning order corresponding to a value of the CCLM mode index; wherein, the second look-up table at least contains one or more different CCLM mode indices corresponding respectively to each of different LFNST coefficient scanning orders.

Exemplarily, in the embodiment of the present application, when an encoder uses a second look-up table to determine an LFNST coefficient scanning order corresponding to a value of the CCLM mode index, if a value of the MIP mode index is within a preset range of one or more integers, the LFNST coefficient scanning order may be set to a horizontal scanning order; if the value of the MIP mode index is not within the preset range of one or more integers, the LFNST coefficient scanning order may be set to a vertical scanning order.

It may be seen that in the present application, for a CCLM mode, an encoder no longer needs to select a transform kernel candidate set by mapping a CCLM mode to a traditional intra prediction mode, but may directly obtain a corresponding LFNST intra prediction mode index based on a CCLM mode index corresponding to the CCLM mode through query of a second look-up table, and finally determine an LFNST coefficient scanning order.

It should be noted that in an embodiment of the present application, if a prediction mode used for a current block is a CCLM mode and a CCLM parameter is CCLM mode index, an encoder may determine a selected LFNST coefficient scanning order according to a value of the CCLM mode index (modeId).

It may be understood that in the present application, a value of a CCLM mode index may include 81, 82, and 83.

Exemplarily, in the present application, when a value of a CCLM mode index is 81 or 82, an LFNST coefficient scanning order may be set to a horizontal scanning order; when a value of a CCLM mode index is 83, an LFNST coefficient scanning order may be set to a vertical scanning order, which is not specifically limited in the embodiments of the present application.

It should be noted that in an embodiment of the present application, if a prediction mode used for a current block is a CCLM mode and a CCLM parameter is a CCLM mode index, an encoder may determine a selected LFNST coefficient scanning order according to a preset integer range.

Exemplarily, in the present application, when a value of a CCLM mode index meets a preset integer range, for example, when the value of the CCLM mode index is 81 or 82, an LFNST coefficient scanning order may be set to a horizontal scanning order; when a value of a CCLM mode index does not meet a preset integer range, for example, when the value of the CCLM mode index is 83, an LFNST coefficient scanning order may be set to a vertical scanning order, etc., which is not specifically limited in the embodiments of the present application.

In addition, if a prediction mode of a current block is a CCLM mode, an LFNST coefficient scanning order may be selected according to one or more information combinations in CCLM parameters.

Further, in an embodiment of the present application, if a prediction mode of a current block is a CCLM mode, an encoder may also map it to a traditional intra prediction mode according to a CCLM parameter, and then select an LFNST coefficient scanning order according to a mapped angle.

Further, in an embodiment of the present application, when a prediction mode parameter indicates that a non-CCLM mode is used for a current block, when selecting an LFNST coefficient scanning order, an encoder may first determine a value of predModeIntra based on the intra prediction mode; if the value of predModeIntra is less than or equal to 34, an LFNST coefficient scanning order used for the current block is set to a horizontal scanning order; if the value of predModeIntra is greater than 34, an LFNST coefficient scanning order used for the current block is set to a vertical scanning order.

That is to say, in the present application, if a prediction mode of a current block is a non-CCLM mode, at this time a value of predModeIntra may be determined according to an intra prediction mode; then, an LFNST coefficient scanning order used for the current block is determined according to the value of predModeIntra.

It should also be noted that when an LFNST is used for a current block, an encoder may also set a value of an LFNST index to a value corresponding to indicating use of the LFNST, and the value of the LFNST index is signalled in a video bitstream.

It may be understood that in the present application, on an encoder side, if an LFNST is used for a current block, then at this time, a value of an LFNST index may be set to a value corresponding to indicating use of the LFNST, and the value of LFNST index is signalled in a video bitstream. In this way, on a decoder side, a value of an LFNST index may be obtained by parsing a bitstream, which is convenient for the decoder side to determine that an LFNST is used for a current block.

In act S106, according to the LFNST coefficient scanning order, an input coefficient matrix of the LFNST is constructed by using the first coefficient matrix.

In act S107, an LFNST processing is performed on the input coefficient matrix to obtain a transform coefficient matrix of the current block.

It should be noted that in an embodiment of the present application, LFNST coefficient scanning orders may include a horizontal scanning order and a vertical scanning order. In this way, after determining an LFNST coefficient scanning order, an input coefficient matrix of an LFNST (i.e. an one-dimensional primary transform coefficient matrix) may be constructed by using a first coefficient matrix. Then, an LFNST processing is performed on the input coefficient matrix obtain a transform coefficient matrix of a current block.

It should be noted that in an embodiment of the present application, an LFNST is to apply a Non-Separable Transform based on direct matrix multiplication. In order to reduce computational complexity and a storage space as much as possible, a simplified Non-Separable Transform technology is used in an LFNST transform. Among them, a main idea of the simplified Non-Separable Transform technology is to map N-dimensional vectors to R-dimensional vectors in a different space, wherein N/R (R<N) is a scaling factor; at this time, a transform matrix corresponding to the simplified Non-Separable Transform technology is an R×N matrix, as shown below.

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix} \quad (9)$$

Figure 10:
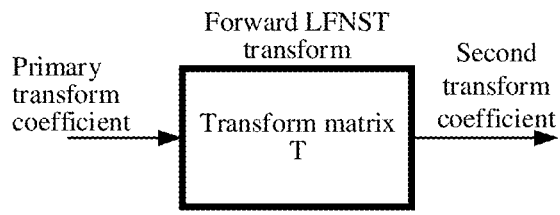
FIG. 10 is a first schematic diagram of a structure of a calculation process of matrix multiplication of an LFNST technology.
Figure 11:
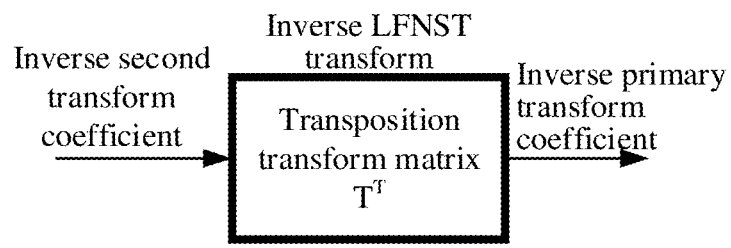
FIG. 11 is a second schematic diagram of a structure of a calculation process of matrix multiplication of an LFNST technology.

Here, transform matrices used for a forward LFNST transform and an inverse LFNST transform are in a transposition relationship with each other. FIG. 10 is a first schematic diagram of a structure of a calculation process of matrix multiplication of an LFNST technology, and FIG. 11 is a second schematic diagram of a structure of a calculation process of matrix multiplication of an LFNST technology. Referring to FIGS. 10 and 11, FIGS. 10 and 11 show a schematic diagram of a structure of a calculation process of matrix multiplication of an LFNST technology according to an embodiment of the present application. As shown in FIG. 10, in a calculation process of a forward LFNST transform, and a second transform coefficient may be obtained after a primary transform coefficient passes through a transform matrix T. FIG. 11 shows a calculation process of an inverse LFNST transform, after an inverse second transform coefficient passes through a transposition transform matrix $T^T$, an inverse primary transform coefficient may be obtained.

Further, in an LFNST technology, it may be determined whether to adopt a 4×4 Non-Separable Transform or an 8×8 Non-Separable Transform according to a size of a current block. Here, the "4×4 Non-Separable Transform" may be collectively referred to as a "4×4 LFNST" and the "8×8 Non-Separable Transform" as an "8×8 LFNST". Among them, assuming that a width of the current block is nTbW and a height is nTbH, it may be concluded that if min(nTbW, nTbH)<=4, then a 4×4 LFNST may be used for the current block; otherwise, an 8×8 LFNST may be used for the current block. It should be noted that a return value of min(A, B) is a smaller value in A and B.

In one embodiment, for a 4×4 LFNST, on an encoder side, 16 coefficients will be input, and 16 or 8 coefficients will be output after a forward LFNST. On a decoder side, 16 or 8 coefficients will be input and 16 coefficients will be output. That is to say, for an encoder and a decoder, a quantity of inputs and a quantity of outputs are just opposite.

Assuming that a size of a Transform Unit (TU) may be represented as nTbW×nTbH, wherein a transform unit is a prediction residual block obtained based on a residual value. That is, a TU may be equal to 4×4, or may be equal to 4×N or N×4 (N>4). Each of them will be described in detail below.

Figure 12:
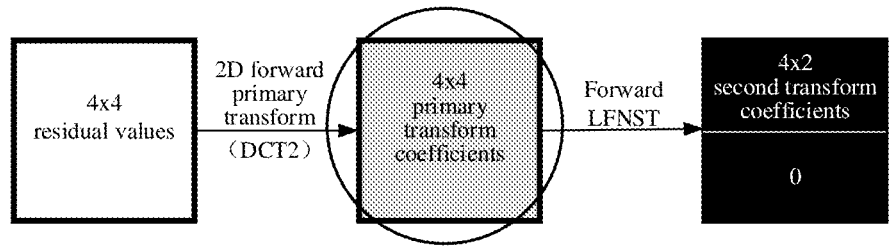
FIG. 12 is a first block diagram of a structure of an LFNST transform.
Figure 13:
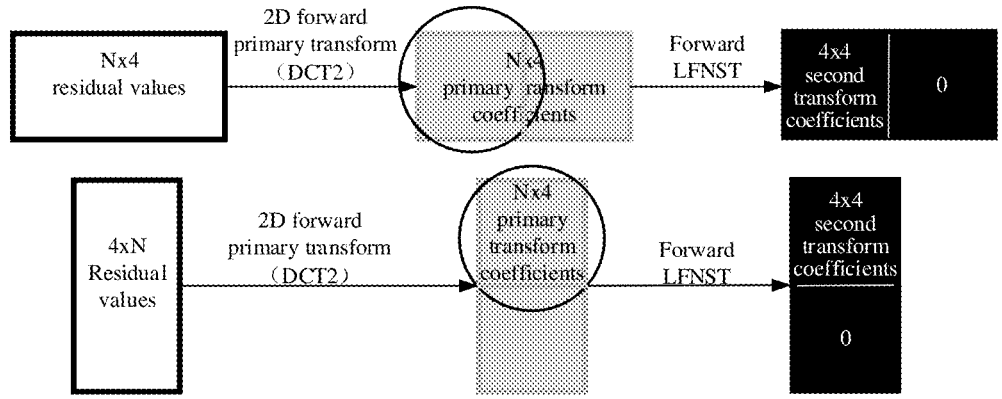
FIG. 13 is a second block diagram of a structure of an LFNST transform.
Figure 14:
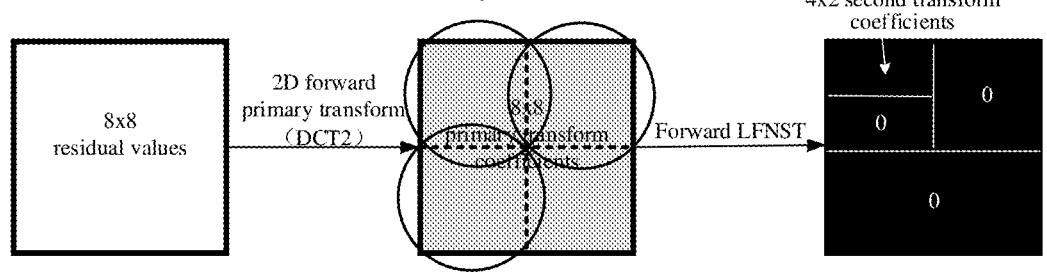
FIG. 14 is a third block diagram of a structure of an LFNST transform.
Figure 15:
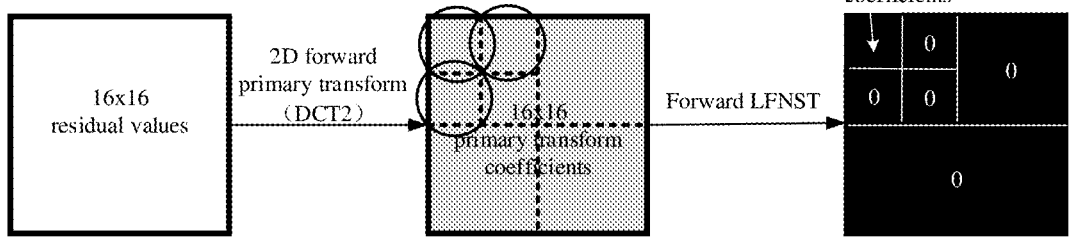
FIG. 15 is a fourth block diagram of a structure of an LFNST transform.

FIG. 12 is a first block diagram of a structure of an LFNST transform; FIG. 13 is a second block diagram of a structure of an LFNST transform; FIG. 14 is a third block diagram of a structure of an LFNST transform; and FIG. 15 is a fourth block diagram of a structure of an LFNST transform. When a TU is 4×4, a forward LFNST process corresponding to a 4×4 transform unit is shown in FIG. 12. Among them, in FIG. 12, a white block is a residual value, a gray block is a primary transform coefficient, and a black block is a second transform coefficient. Here, at a position exemplified by "0", a transform coefficient is set to 0 by an encoder. For the 4×4 transform unit, when performing a forward LFNST, a size of a transform matrix used is 8×16, and all 4×4 primary transform coefficients in a current transform unit are used as input, and output is 4×2 second transform coefficients.

When a TU is 4×N or N×4 (N>4), a forward LFNST process corresponding to a 4×N or N×4 transform unit is shown in FIG. 13. Among them, in FIG. 13, a white block is a residual value, a gray block is a primary transform coefficient, and a black block is a second transform coefficient. Here, for a 4×N or N×4 transform unit, when performing a forward LFNST, a size of a transform matrix used is 16×16, and a primary transform coefficient in a first 4×4 sub-block in a current transform unit (specifically, an uppermost sub-block for a 4×N transform unit and a leftmost sub-block for an N×4 transform unit) is used as input and output is 4×4 second transform coefficients. Here, at a position exemplified by "0", a transform coefficient is still set to 0 by the encoder.

In another embodiment, for an 8×8 LFNST, on an encoder side, 48 coefficients will be input, and 16 or 8 coefficients will be output after a forward LFNST. On a decoder side, 16 or 8 coefficients will be input and 48 coefficients will be output. That is to say, for an encoder and a decoder, a quantity of inputs and a quantity of outputs are just opposite.

When a TU is 8×8, a forward LFNST process corresponding to an 8×8 transform unit is shown in FIG. 14. Among them, in FIG. 14, a white block is a residual value, a gray block is a primary transform coefficient, and a black block is a second transform coefficient. For the 8×8 transform unit, when performing a forward LFNST, a size of a transform matrix used is 8×48. Primary transform coefficients of first three 4×4 sub-blocks in a current transform unit (that is, three sub-blocks in an upper left corner) are used as input, and output is 4×2 second transform coefficients. Here, at a position exemplified by "0", a transform coefficient is still set to 0 by the encoder.

When a TU is greater than 8×8, a forward LFNST process corresponding to a transform unit greater than 8×8 is shown in FIG. 15. Among them, in FIG. 15, a white block is a residual value, a gray block is a primary transform coefficient, and a black block is a second transform coefficient. For the transform unit greater than 8×8, when performing a forward LFNST, a size of a transform matrix used is 48×16. Primary transform coefficients of first three 4×4 sub-blocks in a current transform unit (that is, three sub-blocks in an upper left corner) are used as input, and output is 4×4 second transform coefficients. Here, at a position exemplified by "0", a transform coefficient is still set to 0 by the encoder.

In this way, whether a TU corresponding to a residual value is 4×4, 4×N, or N×4 (N>4), 8×8, or even larger than 8×8, at this time, a transform processing performed on the residual value may be achieved according to FIG. 12 or FIG. 13 or FIG. 14 or FIG. 15.

Therefore, in an embodiment of the present application, for a current block of which intra prediction is performed by using a CCLM mode, a decoder introduces relevant information of a CCLM parameter in a process of an LFNST is performed on the current block by using the CCLM mode, and selects a scanning order according to CCLM information. Therefore, when a transform processing is performed on a current block, a CCLM mode does not need to be mapped to a traditional intra prediction mode, so that applicability of an LFNST technology to the current block by using the CCLM mode may be improved, and selection of a scanning order is more flexible.

This embodiment provides a transform method, which is applied to an encoder, and the encoder determines a prediction mode parameter of a current block; a CCLM parameter is determined when the prediction mode parameter indicates that CCLM is used for the current block to determine an intra prediction value; the intra prediction value of the current block is determined according to the CCLM parameter, and a residual value between the current block and the intra prediction value is calculated; a first transform is performed on the residual value to obtain a first coefficient matrix; when an LFNST is used for the current block, an LFNST coefficient scanning order used for the current block is determined according to the CCLM parameter; an input coefficient matrix of the LFNST is constructed by using the first coefficient matrix according to the LFNST coefficient scanning order; an LFNST processing is performed on the input coefficient matrix to obtain a transform coefficient matrix of the current block; wherein the first transform is a transform different from the LFNST, and LFNST coefficient scanning orders include a horizontal scanning order and a vertical scanning order. Therefore, in an embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to a CCLM parameter corresponding to the current block, so that an LFNST transform may be performed by using the LFNST coefficient scanning order. It may be understood that it is precisely because of introduction of a CCLM parameter in an LFNST transform that selection of an LFNST coefficient scanning order is more flexible, which may improve applicability of an LFNST technology to a CCLM mode, reduce a transform process of the LFNST technology and effectively improve an encoding efficiency.

Figure 16:
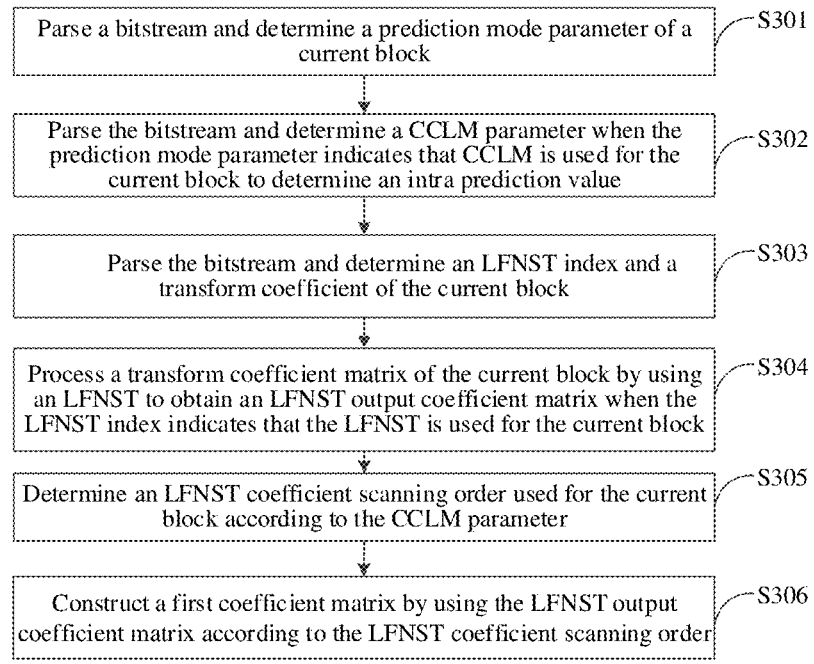
FIG. 16 is a third schematic diagram of an implementation flow of a transform method.

Another embodiment of the present application provides a transform method, which is applied in a decoder. FIG. 16 is a third schematic diagram of an implementation flow of a transform method. As shown in FIG. 16, a method for performing a transform processing by a decoder may include following acts.

In act S301, a bitstream is parsed and a prediction mode parameter of a current block is determined.

In an implementation of the present application, after a bitstream of a video is received, a decoder may parse the bitstream first to determine a prediction mode parameter of a current block.

It should be noted that in an embodiment of the present application, a prediction mode parameter indicates a coding mode of a current block and a parameter related to the mode. Among them, a prediction mode usually includes a traditional intra prediction mode and a non-traditional intra prediction mode, while the traditional intra prediction mode may include a DC mode, a PLANAR mode, and an angular mode, etc., and the non-traditional intra prediction mode may include a MIP mode, a CCLM mode, an IBC mode, and a PLT mode, etc.

It may be understood that in an embodiment of the present application, on an encoder side, prediction coding will be performed for the current block, and in this process, a prediction mode of the current block may be determined, a corresponding prediction mode parameter is signalled in a bitstream, and transmitted by an encoder to a decoder.

Accordingly, in the present application, on a decoder side, an intra prediction mode of a luma or chroma component of a current block or a coding block where a current block is located may be acquired by parsing a bitstream, and at this time, a value of an intra prediction mode indicator (which may be expressed by predModeIntra) may be determined, and a calculation formula is as shown in the above formula (5).

In the formula (5), a colour component indicator (which may be represented by cIdx) is used for indicating a luma component or a chroma component of a current block. Here, if what is predicted for the current block is a luma component, then cIdx is equal to 0; if what is predicted for the current block is a chroma component, then cIdx is equal to 1. In addition, (xTbY, yTbY) is a coordinate of a sample in an upper left corner of the current block, IntraPredModeY [xTbY][yTbY] is an intra prediction mode of a luma component, and IntraPredModeC[xTbY][yTbY] is an intra prediction mode of a chroma component.

That is, in an embodiment of the present application, a decoder may determine a decoding mode of a current block is specifically a traditional intra prediction mode or a non-traditional intra prediction mode through a prediction mode parameter.

In act S302, the bitstream is parsed and a Cross-component Linear Model Prediction (CCLM) parameter is determined when the prediction mode parameter indicates that CCLM is used for the current block to determine an intra prediction value.

In an embodiment of the present application, after a decoder determines a prediction mode parameter of a current block, if the prediction mode parameter indicates that CCLM is used for the current block to determine an intra prediction value, then the decoder may continue to determine a CCLM parameter.

It should be noted that in an embodiment of the present application, a CCLM parameter may include a CCLM mode index, wherein the CCLM mode index is used for indicating a CCLM mode used for the current block, and the CCLM mode is used for indicating a calculation and derivation method of determining an intra prediction value of the current block by using CCLM.

Further, in an embodiment of the present application, a decoder may determine a CCLM parameter by parsing a bitstream, specifically, the decoder determines a CCLM mode index (which may be expressed by modeId) by parsing a bitstream. Among them, a CCLM mode index is used for indicating a CCLM mode used for a current block, and the CCLM mode is used for indicating a calculation and derivation method of determining an intra prediction value of the current block by using CCLM.

It may be understood that in an embodiment of the present application, a CCLM mode may specifically include multiple different prediction modes, so different indices need to be used for calibrating and distinguishing different prediction modes in the CCLM mode. That is to say, different CCLM modes correspond to different CCLM mode indices.

Further, in an embodiment of the present application, when a decoder determines a calculation and derivation method of an intra prediction value of a current block according to a CCLM parameter, it may determine a specific CCLM mode, so that a corresponding CCLM mode index may be obtained.

It should be noted that in an embodiment of the present application, a CCLM mode index may specifically include 81, 82, and 83.

In act S303, the bitstream is parsed and a Low-Frequency Non-Separable Transform (LFNST) index and a transform coefficient of the current block are determined.

In act S304, when the LFNST index indicates that an LFNST is used for the current block, a transform coefficient matrix of the current block is processed by using the LFNST to obtain an LFNST output coefficient matrix.

In an embodiment of the present application, after determining a CCLM parameter corresponding to a current block, a decoder may continue to parse a bitstream, and then further determine an LFNST index and a transform coefficient of the current block.

It should be noted that, in an embodiment of the present application, a value of an LFNST index may be used for indicating whether an LFNST is used for a current block, and an index of an LFNST transform kernel in an LFNST transform kernel candidate set. Specifically, after parsing out an LFNST index, when a value of the LFNST index is equal to 0, it indicates that an LFNST is not used for the current block; but when the value of the LFNST index is greater than 0, it indicates that an LFNST is used for the current block, and an index of a transform kernel is equal to the value of the LFNST index, or an index of a transform kernel is equal to a value obtained by subtracting 1 from the value of the LFNST index.

Further, in an embodiment of the present application, on a decoder side, input data of an LFNST may include: a luma position (xTbY, yTbY) of a current transform unit, a width nTbW of a current block, a height nTbH of the current block, whether the current block is a luma component or a chroma component cIdx, and a coefficient d[x][y] of the current transform unit after Scaling, x=0, 1, . . . , nTbW−1, y=0, 1, . . . , nTbH−1. Correspondingly, output data of the LFNST may include: a primary transform coefficient d'[x][y] generated by a second transform coefficient through the LFNST, x=0, 1, . . . , nLfnstSize−1, y=0, 1, . . . , nLfnstSize−1.

Figure 17:
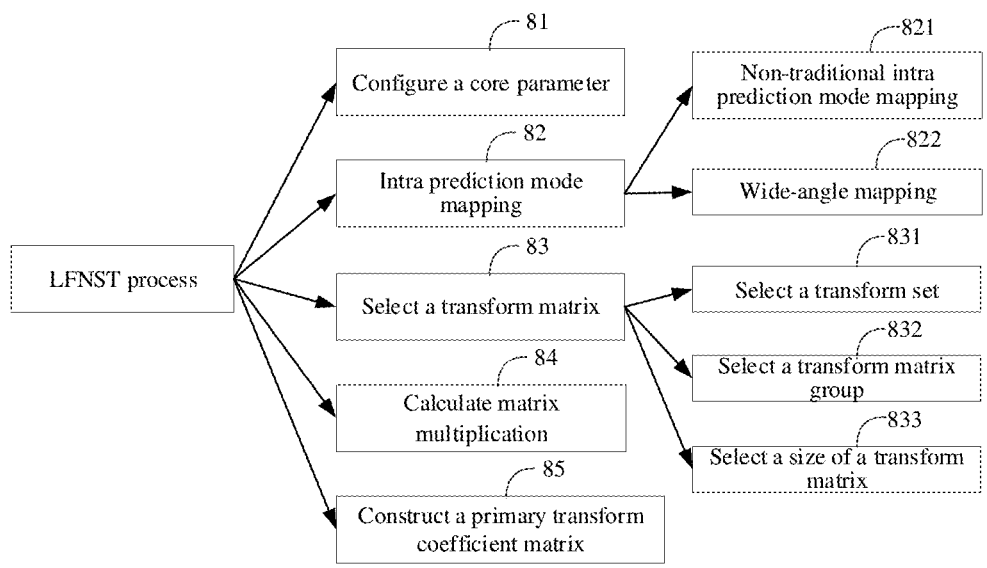
FIG. 17 is a schematic diagram of a processing flow of an LFNST transform.

It may be understood that in an embodiment of the present application, FIG. 17 is a schematic diagram of a processing flow of an LFNST transform. As shown in FIG. 17, a specific process of an LFNST may be partitioned into five acts, specifically including configuring a core parameter 81, intra prediction mode mapping 82, selecting a transform matrix 83, calculating matrix multiplication 84, and constructing a primary transform coefficient matrix 85. Among them, for the intra prediction mode mapping 82, this act is used for determining a value of predModeIntra, and mainly includes: non-traditional intra prediction mode mapping 821 and wide-angle mapping 822. For the selecting the transform matrix 83, this act is used for selecting a transform set and a transform matrix, and mainly includes: selecting a transform set 831, selecting a transform matrix group 832, and selecting a size of transform matrix 833.

For the configuring the core parameter 81, firstly a length of an input second transform coefficient vector (which may be represented by nonZeroSize) and a length of an output primary transform coefficient vector (which may be represented by nLfnstOutSzie) for LFNST calculation need to be configured. Values for nonZeroSize and nLfnstOutSzie are shown in Table 1.

TABLE 1

| Size of Transform Unit | nonZeroSize | nLfnstOutSzie |
|---|---|---|
| 4 × 4 | 8 | 16 |
| 4 × N or N × 4 (N > 4) | 16 | 16 |
| 8 × 8 | 8 | 48 |
| >8 × 8 | 16 | 48 |

In current H.266/VVC, a configuration of parameters such as nonZeroSize and nLfnstOutSzie is calculated through following formulas, which are as follows.

$$nLfnstOutSize=(nTbW>=8\&\&nTbH>=8)?48:16 \quad (10)$$

$$nonZeroSize=(nTbW==4\&\&nTbH==4)|| \\ (nTbW==8\&\&nTbH==8)?8:16 \quad (11)$$

In addition, a decoder also needs to configure a parameter nLfnstSize, which means that there is a primary transform coefficient only within a range of first nLfnstSize×nLfnstSize in a current block, and a value of nLfnstSize is as follows.

$$Log\ 2LfnstSize=(nTbW>=8\&\&nTbH>=8)?3:2 \quad (12)$$

$$nLfnstSize=1<<Log\ 2LfnstSize \quad (13)$$

At this time, an intra prediction mode of a luma or chroma component of the current block or a coding block where the current block is located may be acquired by parsing a bitstream, and a value of an intra prediction mode indicator (which may be expressed by predModeIntra) may be determined at this time, and a calculation formula is the same as the aforementioned formula (5).

Further, a vector u[i] of a second transform coefficient is acquired, i=0, 1, . . . , nonZeroSize−1. When it is determined that an LFNST is used for a current transform unit, a coefficient d[x][y] after Scaling at this time is a second transform coefficient. First nonZeroSize values are acquired according to a diagonal scanning order, that is, the vector u[i] of the second transform coefficient, i=0, 1, . . . , nonZeroSize−1. In a following formula, xC and yC are represented as an abscissa and an ordinate of a coefficient numbered x in a current block relative to an upper left corner point in a diagonal order), xC and yC are as follows.

$$xC=DiagScanOrder[2][2][x][0] \quad (14)$$

$$yC=DiagScanOrder[2][2][x][1] \quad (15)$$

$$u[i]=d[xC][yC] \quad (16)$$

Further, for the intra prediction mode mapping 82, an intra prediction mode may be partitioned into a traditional intra prediction mode and a non-traditional intra prediction mode. For a non-traditional intra prediction mode, information indicated by a value of predModeIntra is as follows: it indicates that a prediction mode of a current block is a CCLM mode if the value of predModeIntra may be INTRA_LT_CCLM, INTRA_L_CCLM, or INTRA_T_CCLM (81, 82, 83 in VVC respectively); it indicates that a prediction mode of a current block is a Matrix-based Intra Prediction (MIP) mode if intra_mip_flag[xTbY][yTbY] is equal to 1 and cIdx is equal to 0, and at this time the value of predModeIntra indicates a MIP mode index modeId used; if it is not in the above two situations, the value of predModeIntra may be in [0, 66], it indicates that a prediction mode of a current block is a traditional intra prediction mode.

Further, by parsing a bitstream, an LFNST transform kernel candidate set index is determined according to a number of a traditional intra prediction mode. At this time, if the prediction mode of the current block is a CCLM mode or a MIP mode, the value of predModeIntra may also be set in following ways.

(1) When the value of predModeIntra indicates INTRA_LT_CCLM, INTRA_L_CCLM, or INTRA_T_CCLM (81, 82, 83 in VVC respectively), if a mode of a central luma block of a luma position corresponding to the current block (such as a chroma block) is a MIP mode, that is, intra_mip_flag [xTbY+nTbW/2][yTbY+nTbH/2] is 1, then the value of predModeIntra is set to an index (i.e. 0) indicating a PLANAR mode; otherwise, if the mode of the central luma block of the luma position corresponding to the current block (such as the chroma block) is an IBC mode or a PLT mode, the value of predModeIntra is set to an index (i.e. 1) indicating a DC mode; otherwise, the value of predModeIntra is set to a value IntraPredModeY[xTbY+nTbW/2] [yTbY+nTbH/2] of a mode index of the central luma block corresponding to the luma position of the current block (such as the chroma block).

(2) When intra_mip_flag[xTbY][yTbY] is equal to 1 and cIdx is equal to 0, that is, a prediction mode of a current block is a MIP mode, the value of predModeIntra may be directly set to an index (that is, 0) indicating a PLANAR mode.

For a traditional intra prediction mode (such as wide-angle mapping), in a process of parsing a bitstream, wide-angle mapping may be performed according to a size of a current block, and a traditional intra prediction mode [0, 66] may be extended to [−14, 80]. A specific mapping process is as follows.

First, an aspect ratio factor (which may be represented by whRatio) is calculated, as shown in the above formula (6).

For a current block that is not square (that is, nTbW is not equal to nTbH), at this time following correction may be made to a value of predModeIntra: if nTbW is greater than nTbH, predModeIntra is greater than or equal to 2, and predModeIntra is less than ((whRatio>1? (8+2×whRatio):8), then predModeIntra=(predModeIntra+65); otherwise, if the nTbW is less than nTbH, predModeIntra is less than or equal to 66, and predModeIntra is greater than ((whRatio>1? (60−2×whRatio):60), then predModeIntra=(predModeIntra−67).

In current H.266/VVC, a value of an LFNST index (which may be represented by SetIdx) may be determined according to a value of predModeIntra and Table 2, and a specific value is shown in Table 2. Here, the value of the LFNST index is set to indicate that an LFNST is used for a current block and an index of an LFNST transform kernel in an LFNST transform kernel candidate set. Generally speaking, an LFNST transform set includes four transform kernel candidate sets (set0, set1, set2, and set3), and values corresponding to SetIdx are 0, 1, 2, and 3 respectively.

TABLE 2

| predModeIntra | SetIdx |
| --- | --- |
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

Since an LFNST transform matrix is a matrix with multiple fixed coefficients obtained through training, and an LFNST transform kernel candidate set includes two groups of transform matrices (may also be called LFNST transform kernels). Therefore, after determining an LFNST transform kernel candidate set, a group of LFNST transform kernels need to be selected from the LFNST transform kernel candidate set, that is, a transform matrix used when performing an LFNST on a current block is determined.

It should also be noted that on an encoder side, a group of LFNST transform kernels may be selected through an RDCost, and an index (which may be represented as lfnst_idx) corresponding to an LFNST transform kernel may be signalled in a video bitstream and transmitted to a decoder side. Therefore, at the decoder side, a value of lfnst_idx may be obtained by parsing the bitstream. Then, according to the value of lfnst_idx, a transform matrix (transform kernel) indicated by lfnst_idx may be selected from an LFNST transform kernel candidate set. For example, when a value of lfnst_idx is 1, a first group of LFNST transform kernels (that is, a first group of transform matrices) in an LFNST transform kernel candidate set will be selected. When the value of lfnst_idx is equal to 2, a second group of LFNST transform kernels (that is, a second group of transform matrices) in the LFNST transform kernel candidate set will be selected.

Further, for each group of transform matrices (transform kernels), basic transform matrices with two sizes are contained, and sizes of basic transform matrices used at the decoder side are 16×16 and 48×16. Selection is made according to nLfnstOutSize, if nLfnstOutSize is 16, a basic transform matrix of 16×16 is selected; or, if nLfnstOutSize is 48, a basic transform matrix of 48×16 is selected; or, if nonZeroSize is 8, only first eight rows in a transform matrix are used for matrix multiplication.

Further, a second transform coefficient vector u[i] is taken as input, and a transform matrix is multiplied by the u[i] to obtain a primary transform coefficient vector v[j], here, i=0, 1, . . . , nonZeroSize−1, j=0, 1, . . . , nLfnstOutSize−1. Assuming that a transform matrix obtained in a previous act is lowFreqTransMatrix, a specific calculation process of v[j] is as follows.

$$v[j] = \text{Clip3}\left(\text{CoeffMin, CoeffMax,} \left(\sum_{j=0}^{nonZeroSize-1} lowFreqTransMatrix[j][i] \times u[i] + 64\right) \gg 7\right) \quad (17)$$

Here, Clip3 works for embedding, and a value of a coefficient may be limited between following two numbers, as shown below.

CoeffMin=−(1<<15)  (18)

CoeffMax=(1<<15)−1  (19)

In this way, after the above matrix calculation, a transform processing for a transform coefficient may be achieved. Here, for a 4×4 LFNST, on a decoder side, 16 or 8 coefficients will be input and 16 coefficients will be output. For an 8×8 LFNST, on the decoder side, 16 or 8 coefficients will be input and 48 coefficients will be output, so as to achieve an LFNST transform processing for transform coefficients and obtain an LFNST output coefficient matrix.

In act S305, an LFNST coefficient scanning order used for the current block is determined according to the CCLM parameter.

In an embodiment of the present application, the decoder may further determine an LFNST transform kernel used for the current block according to the CCLM parameter.

It may be understood that, in an embodiment of the present application, a CCLM parameter may include a CCLM mode index, wherein the CCLM mode index is used for indicating a CCLM mode used for the current block, and the CCLM mode is used for indicating a calculation and derivation method of determining an intra prediction value of the current block by using CCLM.

Figure 18:
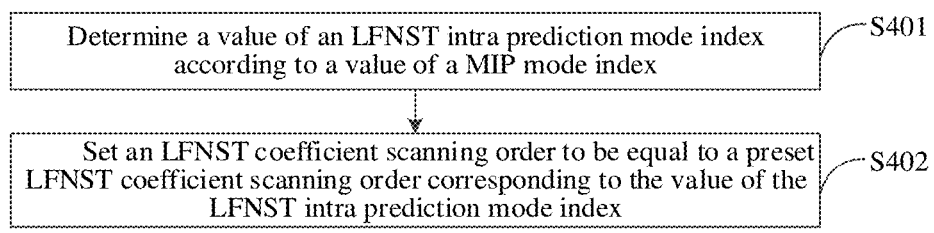
FIG. 18 is a fourth schematic diagram of an implementation flow of a transform method.

Exemplarily, in an embodiment of the present application, when an LFNST is used for a current block, FIG. 18 is a fourth schematic diagram of an implementation flow of a transform method. As shown in FIG. 18, when a CCLM parameter is a CCLM mode index, the method for a decoder to determine an LFNST coefficient scanning order used for a current block according to the CCLM parameter may include following acts.

In act S401, a value of a Low-Frequency Non-Separable Transform (LFNST) intra prediction mode index is determined according to a value of a Matrix-based Intra Prediction (MIP) mode index.

In act S402, an LFNST coefficient scanning order is set to be equal to a preset LFNST coefficient scanning order corresponding to the value of the LFNST intra prediction mode index.

It should be noted that, in an embodiment of the present application, a CCLM mode index is used for indicating a CCLM mode used for the current block, and the CCLM mode is used for indicating a calculation and derivation method of determining an intra prediction value of the current block by using CCLM. That is to say, a decoder may further determine an LFNST transform kernel according to a CCLM mode index.

Further, in an embodiment of the present application, after determining a CCLM mode index, a decoder may also convert the CCLM mode index into a value of an LFNST intra prediction mode index (which may be expressed by predModeIntra). Then, according to the value of predModeIntra, an LFNST coefficient scanning order is determined, such as a horizontal scanning order or a vertical scanning order.

It should be noted that in an embodiment of the present application, when a decoder determines an LFNST coefficient scanning order used for a current block, a value of an LFNST intra prediction mode index may be obtained by looking up a table.

Exemplarily, in an embodiment of the present application, when a decoder determines a value of an LFNST intra prediction mode index according to a value of the CCLM mode index, it may specifically use a first look-up table to determine the value of the LFNST intra prediction mode index corresponding to the value of the CCLM mode index, wherein the first look-up table at least contains one or more different CCLM mode indices corresponding respectively to each of two LFNST intra prediction mode indices of different values.

It should be noted that in an embodiment of the present application, the first look-up table (Look-Up Table 1, LUT1) is used for reflecting a corresponding relationship between a CCLM mode index and an LFNST intra prediction mode index, that is, the first look-up table at least contains one or more different CCLM mode indices corresponding respectively to each of two LFNST intra prediction mode indices of different values.

That is to say, in the present application, different CCLM modes may correspond to different values of predModeIntra. Therefore, a decoder determines a CCLM mode index according to a CCLM mode, then determines a value of predModeIntra according to a first look-up table, and then determines an LFNST coefficient scanning order used for a current block according to the value of predModeIntra.

It may be seen that in the present application, for a CCLM mode, a decoder no longer needs to select a transform kernel candidate set by mapping a CCLM mode to a traditional intra prediction mode, but may directly obtain a corresponding LFNST intra prediction mode index based on a CCLM mode index corresponding to the CCLM mode through query of a first look-up table, and finally determine an LFNST coefficient scanning order.

In an embodiment of the present application, further, a decoder may also directly determine an LFNST coefficient scanning order according to a value of a CCLM mode index. At this time, a value of predModeIntra is no longer needed, that is, a value of an LFNST intra prediction mode index is no longer needed to be determined according to a CCLM mode index.

In an embodiment of the present application, further, when an LFNST is used for a current block, when a decoder determines an LFNST coefficient scanning order used for the current block according to the CCLM parameter, the decoder may specifically set the LFNST coefficient scanning order to be equal to a preset LFNST coefficient scanning order corresponding to the value of the CCLM mode index.

Exemplarily, in an embodiment of the present application, when a decoder sets the LFNST coefficient scanning order to be equal to a preset LFNST coefficient scanning order corresponding to the value of the CCLM mode index, the decoder may specifically use a second look-up table to determine an LFNST coefficient scanning order corresponding to a value of the CCLM mode index; wherein, the second look-up table at least contains one or more different CCLM mode indices corresponding respectively to each of different LFNST coefficient scanning orders.

Exemplarily, in the embodiment of the present application, when a decoder uses a second look-up table to determine an LFNST coefficient scanning order corresponding to a value of the CCLM mode index, if a value of the MIP mode index is within a preset range of one or more integers, the LFNST coefficient scanning order may be set to a horizontal scanning order; if the value of the MIP mode index is not within the preset range of one or more integers, the LFNST coefficient scanning order may be set to a vertical scanning order.

It may be seen that in the present application, for a CCLM mode, a decoder no longer needs to select a transform kernel candidate set by mapping a CCLM mode to a traditional intra prediction mode, but may directly obtain a corresponding LFNST intra prediction mode index based on a CCLM mode index corresponding to the CCLM mode through query of a second look-up table, and finally determine an LFNST coefficient scanning order.

It should be noted that in an embodiment of the present application, if a prediction mode used for a current block is a CCLM mode and a CCLM parameter is a CCLM mode index, a decoder may determine a selected LFNST coefficient scanning order according to a value of the CCLM mode index (modeId).

It may be understood that in the present application, a value of a CCLM mode index may include 81, 82, and 83.

Exemplarily, in the present application, when a value of a CCLM mode index is 81 or 82, an LFNST coefficient scanning order may be set to a horizontal scanning order; when a value of a CCLM mode index is 83, an LFNST coefficient scanning order may be set to a vertical scanning order, which is not specifically limited in the embodiments of the present application.

It should be noted that in an embodiment of the present application, if a prediction mode used for a current block is a CCLM mode and a CCLM parameter is a CCLM mode index, a decoder may determine a selected LFNST coefficient scanning order according to a preset integer range.

Exemplarily, in the present application, when a value of a CCLM mode index meets a preset integer range, for example, when the value of the CCLM mode index is 81 or 82, an LFNST coefficient scanning order may be set to a horizontal scanning order; when a value of a CCLM mode index does not meet a preset integer range, for example, when the value of the CCLM mode index is 83, an LFNST coefficient scanning order may be set to a vertical scanning order, etc., which is not specifically limited in the embodiments of the present application.

In addition, if a prediction mode of a current block is a CCLM mode, an LFNST coefficient scanning order may be selected according to one or more information combinations in CCLM parameters.

Further, in an embodiment of the present application, if a prediction mode of a current block is a CCLM mode, a decoder may also map with a traditional intra prediction mode according to a CCLM parameter and map the CCLM mode to one traditional intra prediction mode, and then select an LFNST coefficient scanning order according to a mapped angle.

Further, in an embodiment of the present application, when a prediction mode parameter indicates that a non-CCLM mode is used for a current block, when selecting an LFNST coefficient scanning order, a decoder may first determine a value of predModeIntra based on the intra prediction mode; if the value of predModeIntra is less than or equal to 34, an LFNST coefficient scanning order used for the current block is set to a horizontal scanning order; if the value of predModeIntra is greater than 34, an LFNST coefficient scanning order used for the current block is set to a vertical scanning order.

That is to say, in the present application, if a prediction mode of a current block is a non-CCLM mode, at this time a value of predModeIntra may be determined according to an intra prediction mode; then, an LFNST coefficient scanning order used for the current block is determined according to the value of predModeIntra.

It should also be noted that when an LFNST is used for a current block, an encoder may also set a value of an LFNST index to a value corresponding to indicating use of the LFNST, and the value of the LFNST index is signalled in a video bitstream.

It may be understood that in the present application, on an encoder side, if an LFNST is used for a current block, then at this time, a value of an LFNST index may be set to a value corresponding to indicating use of the LFNST, and the value of LFNST index is signalled in a video bitstream. In this way, on a decoder side, a value of an LFNST index may be obtained by parsing a bitstream, which is convenient for the decoder side to determine that an LFNST is used for a current block.

In act S306, according to the LFNST coefficient scanning order, a first coefficient matrix is constructed by using the LFNST output coefficient matrix.

In an embodiment of the present application, after determining an LFNST coefficient scanning order, a decoder may further construct a first coefficient matrix by using the LFNST output coefficient matrix according to the LFNST coefficient scanning order.

It should be noted that an LFNST coefficient scanning order includes a vertical scanning order and a horizontal scanning order. In addition, after determining an LFNST coefficient scanning order, an LFNST output coefficient matrix may be used for constructing a first coefficient matrix; here, the first coefficient matrix may be a two-dimensional primary transform coefficient matrix.

Further, in an embodiment of the present application, after a decoder uses the LFNST output coefficient matrix to construct a first coefficient matrix according to the LFNST coefficient scanning order, that is, after act S306, the decoder may first construct an intra prediction value of the current block according to the CCLM parameter; then, a transform processing different from an LFNST is performed on the first coefficient matrix to obtain a residual value of the current block; finally, a sum value of the intra prediction value and the residual value may be calculated, and the sum value may be used as a reconstructed value of the current block.

That is to say, in an embodiment of the present application, after constructing a first coefficient matrix, a decoder may perform a first transform on the first coefficient matrix to obtain a residual value of a current block; here, the first transform is a transform processing different from an LFNST. In addition, after determining a prediction mode parameter of a current block by parsing a bitstream, if a prediction mode is a CCLM mode, a prediction processing may also be performed on the current block according to the CCLM mode to obtain an intra prediction value of the current block; a summation processing is performed according to the intra prediction value and a residual value, and then an obtained sum is used as a reconstructed value of the current block, so that an encoding and decoding processing for the current block may be achieved, and an original value of the current block can be recovered.

Therefore, in an embodiment of the present application, for a current block of which intra prediction is performed by using a CCLM mode, a decoder introduces relevant information of a CCLM parameter in a process of an LFNST is performed on the current block by using the CCLM mode, and selects a scanning order according to CCLM information. Therefore, when a transform processing is performed on a current block, a CCLM mode does not need to be mapped to a traditional intra prediction mode, so that applicability of an LFNST technology to the current block by using the CCLM mode may be improved, and selection of a scanning order is more flexible.

This embodiment provides a transform method, which is applied to a decoder. The decoder parses a bitstream and determines a prediction mode parameter of a current block. When the prediction mode parameter indicates that CCLM is used for the current block to determine an intra prediction value, the bitstream is parsed and a CCLM parameter is determined. The bitstream is parsed and an LFNST intra prediction mode index and a transform coefficient of the current block are determined. When the LFNST intra prediction mode index indicates that an LFNST is used for the current block, a transform coefficient matrix of the current block is processed by using the LFNST to obtain an LFNST output coefficient matrix. According to the CCLM parameter, an LFNST coefficient scanning order used for the current block is determined. According to the LFNST coefficient scanning order, a first coefficient matrix is constructed by using the LFNST output coefficient matrix; wherein the LFNST coefficient scanning order includes a vertical scanning order and a horizontal scanning order. Therefore, in an embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to a CCLM parameter corresponding to the current block, so that an LFNST transform may be performed by using the LFNST coefficient scanning order. It may be understood that it is precisely because of introduction of a CCLM parameter in an LFNST transform that selection of an LFNST coefficient scanning order is more flexible, which may improve applicability of an LFNST technology to a CCLM mode, reduce a transform process of the LFNST technology and effectively improve an encoding efficiency.

Figure 19:
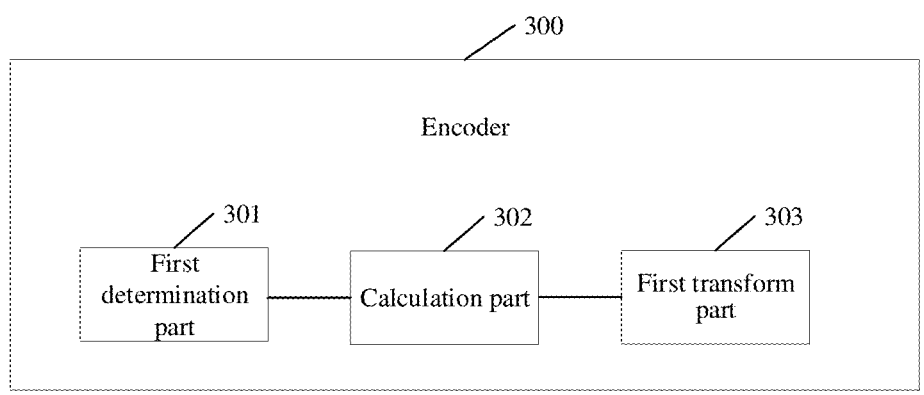
FIG. 19 is a first schematic diagram of a structure of an encoder.

Based on the above embodiments, in another embodiment of the present application, FIG. 19 is a first schematic diagram of a structure of an encoder. As shown in FIG. 19, the encoder 300 according to an embodiment of the present application may include a first determination part 301, a calculation part 302, a first transform part 303, and a first construction part 304.

The first determination part 301 is configured to determine a prediction mode parameter of a current block; determine a CCLM parameter when the prediction mode parameter indicates that CCLM is used for the current block to determine an intra prediction value; and determine the intra prediction value of the current block according to the CCLM parameter.

The calculation part 302 is configured to calculate a residual value between the current block and the intra prediction value according to the CCLM parameter.

The first transform part 303 is configured to perform a first transform on the residual value to obtain a first coefficient matrix.

The first determination part 301 is further configured to determine an LFNST coefficient scanning order used for the current block according to an MIP parameter when an LFNST is used for the current block.

The first construction part 304 is configured to construct an input coefficient matrix of the LFNST by using the first coefficient matrix according to the LFNST coefficient scanning order.

The first transform part 303 is further configured to perform an LFNST processing on the input coefficient matrix to obtain a transform coefficient matrix of the current block; wherein the first transform is a transform different from the LFNST, and LFNST coefficient scanning orders include a horizontal scanning order and a vertical scanning order.

Figure 20:
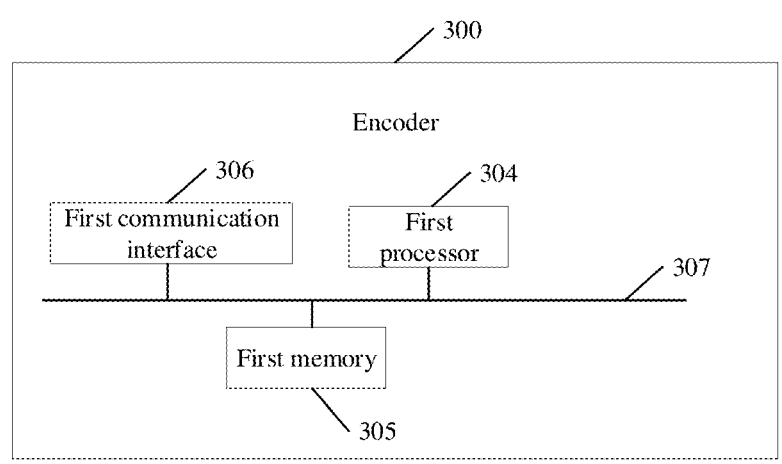
FIG. 20 is a second schematic diagram of a structure of an encoder.

FIG. 20 is a second schematic diagram of a structure of an encoder. As shown in FIG. 20, an encoder 300 according to an embodiment of the present application may further include a first processor 305, a first memory 306 storing instructions executable by the first processor 305 thereon, a first communication interface 307, and a first bus 308 configured to connect the first processor 305, the first memory 306, and the first communication interface 307.

Further, in the embodiment of the present application, the first processor 305 is configured to determine a prediction mode parameter of a current block; determine a CCLM parameter when the prediction mode parameter indicates that CCLM is used for the current block to determine an intra prediction value; determine the intra prediction value of the current block according to the CCLM parameter, and calculate a residual value between the current block and the intra prediction value; perform a first transform on the residual value to obtain a first coefficient matrix; determine an LFNST coefficient scanning order used for the current block according to the CCLM parameter when an LFNST is used for the current block; use the first coefficient matrix to construct an input coefficient matrix of the LFNST according to the LFNST coefficient scanning order; perform an LFNST processing on the input coefficient matrix to obtain a transform coefficient matrix of the current block; wherein the first transform is a transform different from the LFNST, and LFNST coefficient scanning orders include a horizontal scanning order and a vertical scanning order.

In addition, various functional modules in the embodiments may be integrated into one processing unit, or various units may be physically presented separately, or two or more than two units may be integrated into one unit. The integrated units may be implemented in a form of hardware, or may be implemented in a form of a software functional module.

The integrated unit, if implemented in a form of a software functional module and not sold or used as an independent product, may be stored in a computer-readable storage medium. Based on such understanding, the technical solutions of the embodiments, in essence, or part contributing to the prior art, or all or part of the technical solutions, may be embodied in a form of a software product. The computer software product is stored in a storage medium, and includes several instructions for enabling a computer device (which may be a personal computer, a server, or a network device, etc.) or a processor to perform all or part of acts of the methods of the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

This embodiment provides an encoder, and the encoder determines a prediction mode parameter of a current block; a CCLM parameter is determined when the prediction mode parameter indicates that CCLM is used for the current block to determine an intra prediction value; the intra prediction value of the current block is determined according to the CCLM parameter, and a residual value between the current block and the intra prediction value is calculated; a first transform is performed on the residual value to obtain a first coefficient matrix; when an LFNST is used for the current block, an LFNST coefficient scanning order used for the current block is determined according to the CCLM parameter; an input coefficient matrix of the LFNST is constructed by using the first coefficient matrix according to the LFNST coefficient scanning order; an LFNST processing is performed on the input coefficient matrix to obtain a transform coefficient matrix of the current block; wherein the first transform is a transform different from the LFNST, and LFNST coefficient scanning orders include a horizontal scanning order and a vertical scanning order. Therefore, in an embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to a CCLM parameter corresponding to the current block, so that an LFNST transform may be performed by using the LFNST coefficient scanning order. It may be understood that it is precisely because of introduction of a CCLM parameter in an LFNST transform that selection of an LFNST coefficient scanning order is more flexible, which may improve applicability of an LFNST technology to a CCLM mode, reduce a transform process of the LFNST technology and effectively improve an encoding efficiency.

Figure 21:
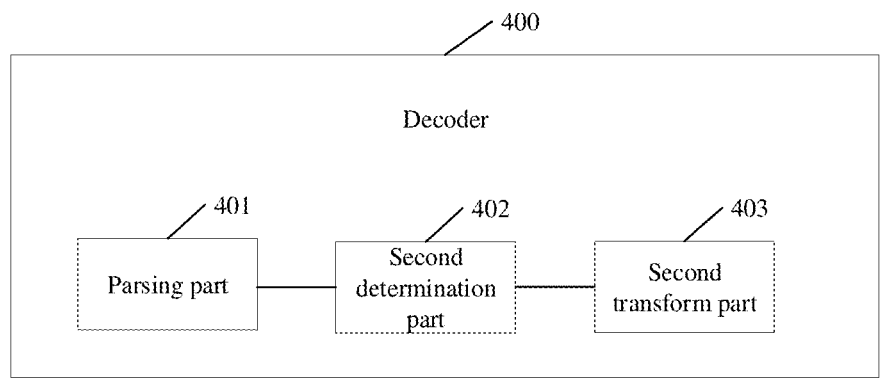
FIG. 21 is a first schematic diagram of a structure of a decoder.

FIG. 21 is a first schematic diagram of a structure of a decoder. As shown in FIG. 21, a decoder 400 according to an embodiment of the present application may include a parsing part 401, a second transform part 402, a second determination part 403, and a second construction part 404.

The parsing part 401 is configured to parse a bitstream and determine a prediction mode parameter of a current block; parse the bitstream and determine a CCLM parameter when the prediction mode parameter indicates that CCLM is used for the current block to determine an intra prediction value; and parse the bitstream and determine a transform coefficient matrix of the current block and an LFNST intra prediction mode index.

The second transform part 402 is configured to process the transform coefficient matrix of the current block by using an LFNST to obtain an LFNST output coefficient matrix when the LFNST intra prediction mode index indicates that the LFNST is used for the current block.

The second determination part 403 is configured to determine an LFNST coefficient scanning order used for the current block according to an MIP parameter.

The second construction part 404 is configured to construct a first coefficient matrix by using the LFNST output coefficient matrix according to the LFNST coefficient scanning order; wherein the LFNST coefficient scanning order includes a vertical scanning order and a horizontal scanning order.

Figure 22:
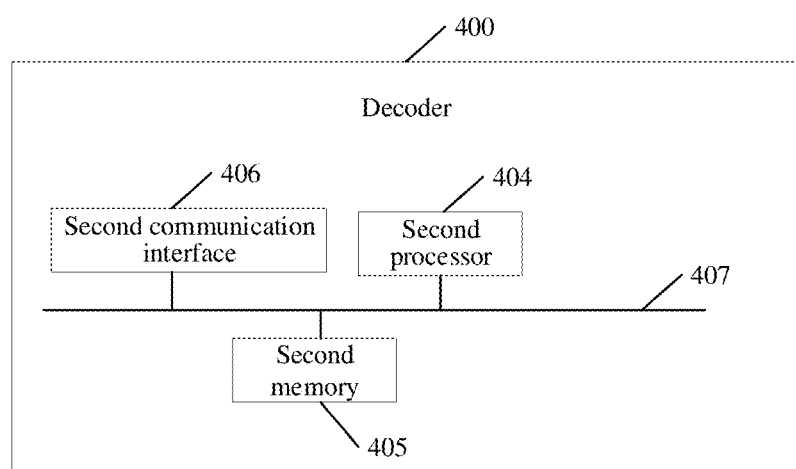
FIG. 22 is a second schematic diagram of a structure of a decoder.

FIG. 22 is a second schematic diagram of a structure of a decoder. As shown in FIG. 22, a decoder 400 according to an embodiment of the present application may further include a second processor 405, a second memory 406 configured to store instructions executable by the second processor 405, a second communication interface 407, and a second bus 408 configured to connect the second processor 405, the second memory 406, and the second communication interface 407.

Further, in the embodiment of the present application, the second processor 405 is configured to parse a bitstream and determine a prediction mode parameter of a current block; parse the bitstream and determine a CCLM parameter when the prediction mode parameter indicates that CCLM is used for the current block to determine an intra prediction value; parse the bitstream and determine an LFNST intra prediction mode index and a transform coefficient of the current block; process a transform coefficient matrix of the current block by using an LFNST to obtain an LFNST output coefficient matrix when the LFNST intra prediction mode index indicates that the LFNST is used for the current block; determine an LFNST coefficient scanning order used for the current block according to the CCLM parameter; construct a first coefficient matrix by using the LFNST output coefficient matrix according to the LFNST coefficient scanning order; wherein the LFNST coefficient scanning order includes a vertical scanning order and a horizontal scanning order.

In addition, various functional modules in the embodiments may be integrated into one processing unit, or various units may be physically presented separately, or two or more than two units may be integrated into one unit. The integrated units may be implemented in a form of hardware, or may be implemented in a form of a software functional module.

The integrated unit, if implemented in a form of a software functional module and not sold or used as an independent product, may be stored in a computer-readable storage medium. Based on such understanding, the technical solutions of the embodiments, in essence, or part contributing to the prior art, or all or part of the technical solutions, may be embodied in a form of a software product. The computer software product is stored in a storage medium, and includes several instructions for enabling a computer device (which may be a personal computer, a server, or a network device, etc.) or a processor to perform all or part of acts of the methods of the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

This embodiment provides a decoder. The decoder parses a bitstream and determines a prediction mode parameter of a current block. When the prediction mode parameter indicates that CCLM is used for the current block to determine an intra prediction value, the bitstream is parsed and a CCLM parameter is determined. The bitstream is parsed and an LFNST intra prediction mode index and a transform coefficient of the current block are determined. When the LFNST intra prediction mode index indicates that an LFNST is used for the current block, a transform coefficient matrix of the current block is processed by using the LFNST to obtain an LFNST output coefficient matrix. According to the CCLM parameter, an LFNST coefficient scanning order used for the current block is determined. According to the LFNST coefficient scanning order, a first coefficient matrix is constructed by using the LFNST output coefficient matrix; wherein the LFNST coefficient scanning order includes a vertical scanning order and a horizontal scanning order. Therefore, in an embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to a CCLM parameter corresponding to the current block, so that an LFNST transform may be performed by using the LFNST coefficient scanning order. It may be understood that it is precisely because of introduction of a CCLM parameter in an LFNST transform that selection of an LFNST coefficient scanning order is more flexible, which may improve applicability of an LFNST technology to a CCLM mode, reduce a transform process of the LFNST technology and effectively improve an encoding efficiency.

An embodiment of the present application provides a computer-readable storage medium on which a program is stored, when the program is executed by a processor, the method described in the foregoing embodiment is implemented.

Specifically, program instructions corresponding to a transform method in an embodiment may be stored on a storage medium such as an optical disk, a hard disk, and a U disk. When program instructions corresponding to a transform method in a storage medium are read or executed by an electronic device, following acts are included: determining a prediction mode parameter of a current block; determining a CCLM parameter when the prediction mode parameter indicates that CCLM is used for the current block to determine an intra prediction value; determining the intra prediction value of the current block according to the CCLM parameter and calculating a residual value between the current block and the intra prediction value; performing a first transform on the residual value to obtain a first coefficient matrix; determining an LFNST coefficient scanning order used for the current block according to the CCLM parameter when an LFNST is used for the current block; constructing an input coefficient matrix of the LFNST by using the first coefficient matrix according to the LFNST coefficient scanning order; and performing an LFNST processing on the input coefficient matrix to obtain a transform coefficient matrix of the current block; wherein the first transform is a transform different from the LFNST, and LFNST coefficient scanning orders include a horizontal scanning order and a vertical scanning order.

Specifically, program instructions corresponding to a transform method in an embodiment may be stored on a storage medium such as an optical disk, a hard disk, and a U disk. When program instructions corresponding to a transform method in a storage medium are read or executed by an electronic device, following acts are included: parsing a bitstream and determining a prediction mode parameter of a current block; parsing the bitstream and determining a CCLM parameter when the prediction mode parameter indicates that CCLM is used for the current block to determine an intra prediction value; parsing the bitstream and determining an LFNST intra prediction mode index and a transform coefficient of the current block; processing a transform coefficient matrix of the current block by using an LFNST to obtain an LFNST output coefficient matrix when the LFNST intra prediction mode index indicates that the LFNST is used for the current block; determining an LFNST coefficient scanning order used for the current block according to the CCLM parameter; and constructing a first coefficient matrix by using the LFNST output coefficient matrix according to the LFNST coefficient scanning order; wherein the LFNST coefficient scanning order includes a vertical scanning order and a horizontal scanning order.

It should be understood by a person skilled in the art that the embodiments of the present application may be provided as methods, systems, or computer program products. Therefore, the present application may use a form of a hardware embodiment, a software embodiment, or an embodiment combining software and hardware. Moreover, the present application may use a form of a computer program product implemented on one or more computer usable storage media (including, but not limited to, a magnetic disk memory, an optical memory, etc.) containing computer usable program codes.

The present application is described with reference to implementation flowcharts and/or block diagrams of the methods, devices (systems), and computer program products of the embodiments of the present application. It should be understood that each flow and/or block in the flowcharts and/or the block diagrams, and combinations of flows and/or blocks in the flowcharts and/or the block diagrams may be implemented by computer program instructions. These computer program instructions may be provided to a processor of a general purpose computer, a special purpose computer, an embedded processing machine, or another programmable data processing device to generate a machine, such that an apparatus for implementing functions specified in one or more flows in the implementation flowcharts and/or one or more blocks in the block diagrams is generated through instructions that are executed by a processor of a computer or another programmable data processing device.

These computer program instructions may also be stored in a computer-readable memory that may guide a computer or another programmable data processing device to operate in a particular manner, such that instructions stored in the computer-readable memory generate an article of manufacture including an instruction apparatus, wherein the instruction apparatus implements functions specified in one or more flows in the implementation flowcharts and/or one or more blocks in the block diagrams.

These computer program instructions may also be loaded on a computer or another programmable data processing device to enable a series of operational acts to be performed on the computer or the another programmable device to generate a computer-implemented processing, such that instructions executed on the computer or the another programmable device provide acts for implementing functions specified in one or more flows in the implementation flowcharts and/or one or more blocks in the block diagrams.

The above are only preferred embodiments of the present application and are not intended to limit the scope of protection of the present application.

INDUSTRIAL APPLICABILITY

The embodiments of the present application provide a transform method, an encoder, a decoder, and a storage medium, wherein the encoder determines a prediction mode parameter of a current block; a CCLM parameter is determined when the prediction mode parameter indicates that CCLM is used for the current block to determine an intra prediction value; the intra prediction value of the current block is determined according to the CCLM parameter, and a residual value between the current block and the intra prediction value is calculated; a first transform is performed on the residual value to obtain a first coefficient matrix; when an LFNST is used for the current block, an LFNST coefficient scanning order used for the current block is determined according to the CCLM parameter; an input coefficient matrix of the LFNST is constructed by using the first coefficient matrix according to the LFNST coefficient scanning order; an LFNST processing is performed on the input coefficient matrix to obtain a transform coefficient matrix of the current block; wherein the first transform is a transform different from the LFNST, and LFNST coefficient scanning orders include a horizontal scanning order and a vertical scanning order. The decoder parses a bitstream and determines a prediction mode parameter of a current block. When the prediction mode parameter indicates that CCLM is used for the current block to determine an intra prediction value, the bitstream is parsed and a CCLM parameter is determined. The bitstream is parsed and an LFNST intra prediction mode index and a transform coefficient of the current block are determined. When the LFNST intra prediction mode index indicates that an LFNST is used for the current block, a transform coefficient matrix of the current block is processed by using the LFNST to obtain an LFNST output coefficient matrix. According to the CCLM parameter, an LFNST coefficient scanning order used for the current block is determined. According to the LFNST coefficient scanning order, a first coefficient matrix is constructed by using the LFNST output coefficient matrix; wherein the LFNST coefficient scanning order includes a vertical scanning order and a horizontal scanning order. Therefore, in an embodiment of the present application, when a codec performs a transform processing on a current block for which a CCLM mode is used for intra prediction, the CCLM mode does not need to be mapped to a traditional intra mode, but an LFNST coefficient scanning order used for the current block may be determined directly according to a CCLM parameter corresponding to the current block, so that an LFNST transform may be performed by using the LFNST coefficient scanning order. It may be understood that it is precisely because of introduction of a CCLM parameter in an LFNST transform that selection of an LFNST coefficient scanning order is more flexible, which may improve applicability of an LFNST technology to a CCLM mode, reduce a transform process of the LFNST technology and effectively improve an encoding efficiency.

What is claimed is:

1. A transform method, applied to an encoder, the method comprising:
    determining a prediction mode parameter of a current block;
    determining a Cross-component Linear Model Prediction (CCLM) parameter when the prediction mode parameter indicates that CCLM is used for the current block to determine an intra prediction value;
    determining the intra prediction value of the current block according to the CCLM parameter and calculating a residual value between the current block and the intra prediction value;
    performing a first transform on the residual value to obtain a first coefficient matrix;
    determining a Low-Frequency Non-Separable Transform (LFNST) coefficient scanning order used for the current block according to the CCLM parameter when an LFNST is used for the current block;
    constructing an input coefficient matrix of the LFNST by using the first coefficient matrix according to the LFNST coefficient scanning order; and
    performing an LFNST processing on the input coefficient matrix to obtain a transform coefficient matrix of the current block; wherein the first transform is a transform different from the LFNST, and LFNST coefficient scanning orders comprise a horizontal scanning order and a vertical scanning order;
    wherein the CCLM parameter comprises a CCLM mode index, wherein the CCLM mode index is used for indicating a CCLM mode used for the current block, and the CCLM mode is used for indicating a calculation and derivation mode of determining the intra prediction value of the current block by using CCLM;
    wherein the determining the LFNST coefficient scanning order used for the current block according to the CCLM parameter comprises:
    determining a value of an LFNST intra prediction mode index according to a value of the CCLM mode index; and setting the LFNST coefficient scanning order to be equal to a preset LFNST coefficient scanning order corresponding to the value of the LFNST intra prediction mode index;
    wherein the determining the value of the LFNST intra prediction mode index according to the value of the CCLM mode index comprises:
    determining the value of the LFNST intra prediction mode index corresponding to the value of the CCLM mode index by using a first look-up table, wherein the first look-up table at least contains one or more different CCLM mode indices corresponding respectively to each of two LFNST intra prediction mode indices of different values.

2. The method according to claim 1, wherein the determining the LFNST coefficient scanning order used for the current block according to the CCLM parameter comprises:
    setting the LFNST coefficient scanning order to be equal to a preset LFNST coefficient scanning order corresponding to the value of the CCLM mode index.

3. The method according to claim 2, further comprising:
    determining the LFNST coefficient scanning order corresponding to the value of the CCLM mode index by using a second look-up table;
    wherein in the second look-up table, each of different LFNST coefficient scanning orders respectively corresponds to one or more different CCLM mode indices.

4. The method according to claim 2, further comprising:
setting the LFNST coefficient scanning order to a horizontal scanning order when the value of the CCLM mode index is within a preset range of one or more integers;
setting the LFNST coefficient scanning order to a vertical scanning order when the value of the CCLM mode index is not within the preset range of one or more integers.

5. The method according to claim 1, wherein after the determining the value of the LFNST intra prediction mode index according to the value of the CCLM mode index, the method further comprises:
setting a value of an LFNST index to a value corresponding to indicating use of the LFNST, and signalling the value of the LFNST index in a video bitstream.

6. A transform method, applied to a decoder, the method comprising:
parsing a bitstream and determining a prediction mode parameter of a current block;
parsing the bitstream and determining a Cross-component Linear Model Prediction (CCLM) parameter when the prediction mode parameter indicates that CCLM is used for the current block to determine an intra prediction value;
parsing the bitstream and determining a Low-Frequency Non-Separable Transform (LFNST) intra prediction mode index and a transform coefficient of the current block;
processing a transform coefficient matrix of the current block by using an LFNST to obtain an LFNST output coefficient matrix when the LFNST intra prediction mode index indicates that the LFNST is used for the current block;
determining an LFNST coefficient scanning order used for the current block according to the CCLM parameter; and
constructing a first coefficient matrix by using the LFNST output coefficient matrix according to the LFNST coefficient scanning order; wherein LFNST coefficient scanning orders comprise a vertical scanning order and a horizontal scanning order;
wherein the CCLM parameter comprises a CCLM mode index, wherein the CCLM mode index is used for indicating a CCLM mode used for the current block, and the CCLM mode is used for indicating a calculation and derivation mode of determining the intra prediction value of the current block by using CCLM;
the determining the LFNST coefficient scanning order used for the current block according to the CCLM parameter comprises:
determining a value of an LFNST intra prediction mode index according to a value of the CCLM mode index; and setting the LFNST coefficient scanning order to be equal to a preset LFNST coefficient scanning order corresponding to the value of the LFNST intra prediction mode index:
wherein the determining the value of the LFNST intra prediction mode index according to the value of the CCLM mode index comprises:
determining the value of the LFNST intra prediction mode index corresponding to the value of the CCLM mode index by using a first look-up table, wherein the first look-up table at least contains one or more different CCLM mode indices corresponding respectively to each of two LFNST intra prediction mode indices of different values.

7. The method according to claim 6, wherein the determining the LFNST coefficient scanning order used for the current block according to the CCLM parameter comprises:
setting the LFNST coefficient scanning order to be equal to a preset LFNST coefficient scanning order corresponding to the value of the CCLM mode index.

8. The method according to claim 7, further comprising:
determining an LFNST coefficient scanning order corresponding to the value of the CCLM mode index by using a second look-up table;
wherein in the second look-up table, each of different LFNST coefficient scanning orders respectively corresponds to one or more different CCLM mode indices.

9. The method according to claim 7, further comprising:
setting the LFNST coefficient scanning order to a horizontal scanning order when the value of the CCLM mode index is within a preset range of one or more integers;
setting the LFNST coefficient scanning order to a vertical scanning order when the value of CCLM mode index is not within the preset range of one or more integers.

10. A decoder, comprising: a processor, and a memory storing instructions executable by the processor, wherein the processor is configured to perform following operations when executing the instructions:
parsing a bitstream and determining a prediction mode parameter of a current block;
parsing the bitstream and determining a Cross-component Linear Model Prediction (CCLM) parameter when the prediction mode parameter indicates that CCLM is used for the current block to determine an intra prediction value;
parsing the bitstream and determining a Low-Frequency Non-Separable Transform (LFNST) intra prediction mode index and a transform coefficient of the current block;
processing a transform coefficient matrix of the current block by using an LFNST to obtain an LFNST output coefficient matrix when the LFNST intra prediction mode index indicates that the LFNST is used for the current block;
determining an LFNST coefficient scanning order used for the current block according to the CCLM parameter; and
constructing a first coefficient matrix by using the LFNST output coefficient matrix according to the LFNST coefficient scanning order; wherein LFNST coefficient scanning orders comprise a vertical scanning order and a horizontal scanning order;
wherein the CCLM parameter comprises a CCLM mode index, wherein the CCLM mode index is used for indicating a CCLM mode used for the current block, and the CCLM mode is used for indicating a calculation and derivation mode of determining the intra prediction value of the current block by using CCLM;
wherein the determining the LFNST coefficient scanning order used for the current block according to the CCLM parameter comprises:
determining a value of an LFNST intra prediction mode index according to a value of the CCLM mode index; and setting the LFNST coefficient scanning order to be equal to a preset LFNST coefficient scanning order corresponding to the value of the LFNST intra prediction mode index;
wherein the determining the value of the LFNST intra prediction mode index according to the value of the CCLM mode index comprises:

determining the value of the LFNST intra prediction mode index corresponding to the value of the CCLM mode index by using a first look-up table, wherein the first look-up table at least contains one or more different CCLM mode indices corresponding respectively to each of two LFNST intra prediction mode indices of different values.

11. The decoder according to claim 10, wherein the determining the LFNST coefficient scanning order used for the current block according to the CCLM parameter comprises:
   setting the LFNST coefficient scanning order to be equal to a preset LFNST coefficient scanning order corresponding to the value of the CCLM mode index.

* * * * *